(12) United States Patent
Landis et al.

(10) Patent No.: US 10,666,342 B1
(45) Date of Patent: May 26, 2020

(54) BEAM MANAGEMENT USING ADAPTIVE LEARNING

(71) Applicant: QUALCOMM Incorporated, San Diego, CA (US)

(72) Inventors: Shay Landis, Hod Hasharon (IL); Assaf Touboul, Netanya (IL); Arthur Gubeskys, San Diego, CA (US); Alexei Yurievitch Gorokhov, San Diego, CA (US); Aamod Dinkar Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/400,864

(22) Filed: May 1, 2019

(51) Int. Cl.
| | | |
|---|---|---|
| *H04K 1/10* | (2006.01) | |
| *H04L 27/28* | (2006.01) | |
| *H04B 7/06* | (2006.01) | |
| *H04B 7/08* | (2006.01) | |
| *G06N 3/04* | (2006.01) | |
| *H04B 17/373* | (2015.01) | |
| *G06N 3/08* | (2006.01) | |
| *H04B 17/382* | (2015.01) | |

(52) U.S. Cl.
CPC ......... *H04B 7/0695* (2013.01); *G06N 3/0454* (2013.01); *G06N 3/08* (2013.01); *H04B 7/088* (2013.01); *H04B 17/373* (2015.01); *H04B 17/382* (2015.01)

(58) Field of Classification Search
CPC .... H04B 7/0695; H04B 7/088; H04B 17/373; H04B 17/382; H04B 7/0452; G06N 3/0454; G06N 3/08; H04W 4/025

USPC ................ 375/260, 346, 295, 316, 219, 220
See application file for complete search history.

(56) References Cited

U.S. PATENT DOCUMENTS

| | | | |
|---|---|---|---|
| 2013/0343303 A1* | 12/2013 | Kim | H04B 7/0452 370/329 |
| 2019/0037530 A1 | 1/2019 | Han et al. | |
| 2019/0052341 A1 | 2/2019 | Furuskog et al. | |
| 2019/0253900 A1* | 8/2019 | Narasimha | H04W 4/025 |

FOREIGN PATENT DOCUMENTS

| | | |
|---|---|---|
| WO | WO-2017184190 A1 | 10/2017 |
| WO | WO-2018135986 A1 | 7/2018 |
| WO | WO-2018204273 A1 | 11/2018 |

\* cited by examiner

*Primary Examiner* — Phuong Phu
(74) *Attorney, Agent, or Firm* — Patterson + Sheridan, LLP

(57) ABSTRACT

Certain aspects of the present disclosure provide techniques for beam management using adaptive learning. Certain aspects provide a method that can be performed by a node, such as user equipment (UE) or a base station (BS). The node determines one or more beams to utilize for a beam management procedure using adaptive learning. The node performs the beam management procedure using the determined one or more beams. In some aspects, the node uses an adaptive reinforcement learning algorithm to select beams for measurement in beam discovery procedure. The node may adaptive the beam management algorithm based on feedback associated with the beam selection, such as based on a throughput achieved using a beam pairing determined during the beam management procedure.

31 Claims, 12 Drawing Sheets

BEAM MANAGEMENT USING ADAPTIVE LEARNING

INTRODUCTION

Aspects of the present disclosure relate to wireless communications, and more particularly, to techniques for beam management.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beam forming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved beam management procedures using adaptive learning.

Certain aspects provide a method for wireless communication by a node. The method generally includes determining one or more beams to utilize for a beam management procedure using adaptive learning. The method generally includes performing the beam management procedure using the determined one or more beams.

In some examples, the node is base station (BS).

In some examples, the node is a user equipment (UE).

In some examples, the method includes updating an adaptive learning algorithm used for the adaptive learning. In some examples, the adaptive learning algorithm is updated based on feedback and/or training information. In some examples, the method includes performing another beam management procedure using the updated adaptive learning algorithm.

In some examples, the feedback includes feedback associated with the beam management procedure.

In some examples, the training information includes one or more of training information obtained from deploying one or more UEs in one or more simulated communication environments prior to network deployment of the one or more UEs; training information obtained by feedback previously received while the one or more UEs was deployed in one or more communication environments; training information from the network, one or more UEs, and/or a cloud; and/or training information received while the node was online and/or idle.

In some examples, the training information includes training information received from one or more UEs, different than the node, after deployment of the node. In some examples, the training information includes information associated with beam. In some examples, the measurements by the one or more UEs or feedback associated with one or more beam management procedures performed by the one or more UEs.

In some examples, using the adaptive learning algorithm includes outputting an action based on one or more inputs. In some examples, the feedback is associated with the action. In some examples, the updating the adaptive learning algorithm based on the feedback includes adjusting one or more weights applied to the one or more inputs.

In some examples, the adaptive learning algorithm includes an adaptive machine learning algorithm; an adaptive reinforcement learning algorithm; an adaptive deep learning algorithm; an adaptive continuous infinite learning algorithm; and/or an adaptive policy optimization reinforcement learning algorithm.

In some examples, the adaptive learning algorithm is modeled as a partially observable Markov Decision Process (POMDP).

In some examples, the adaptive learning algorithm is implemented by an artificial neural network.

In some examples, the artificial neural network comprises a deep Q network (DQN) comprising one or more deep neural networks (DNNs). In some examples, determining the one or more beams using the adaptive learning includes passing state parameters and action parameters through the one or more DNNs; for each state parameter, outputting a value for each action parameter; and selecting an action associated with a maximum output value.

In some examples, updating the adaptive learning algorithm includes adjusting one or more weights associated with one or more neuron connections in the artificial neural network.

In some examples, determining the one or more beams to utilize for the beam management procedure using the adaptive learning includes determining one or more beams to include in a codebook based on the adaptive learning and selecting one or more beams from the codebook to utilize for the beam management procedure.

In some examples, the determining the one or more beams to utilize for the beam management procedure includes using the adaptive learning to select one or more beams from a codebook to utilize for the beam management procedure.

In some examples, the adaptive learning uses a state parameter associated with a channel measurement, a reward parameter associated with a received signal throughput or spectral efficiency, and an action parameter associated with selection of a beam pair corresponding to the channel measurement.

In some examples, the channel measurement includes reference signal receive power (RSRP); spectral efficiency, channel flatness, and/or signal-to-noise ratio (SNR).

In some examples, the received signal comprises a physical downlink shared channel (PDSCH) transmission.

In some examples, the reward parameter is offset by a penalty amount.

In some examples, the penalty amount is dependent on a number of the one or more beams measured for the beam management procedure.

In some examples, the penalty amount is dependent on an amount of power consumption associated with the beam management procedure.

In some examples, the beams include one or more beams utilized for transmission and/or reception of one or more synchronization signal blocks (SSBs).

In some examples, performing the beam management procedure using the determined one or more beams includes measuring a channel based on SSB transmissions from a BS using the determined one or more beams, the SSB transmissions associated with one or more transmit beams of the BS; and selecting one or more beam pair links (BPLs) associated with one or more channel measurements that are above a channel measurement threshold and/or that are one or more strongest channel measurements among all channel measurements associated with the SSB transmissions.

In some examples, the determined one or more beams includes a subset of available receive beams.

In some examples, the method includes receiving a PDSCH using one of the one or more selected BPLs; determining a throughput associated with the PDSCH; updating the adaptive learning algorithm based on the determined throughput; and using the updated adaptive learning algorithm to determine another one or more beams to utilize for performing another beam management procedure to select another one or more BPLs.

Certain aspects provide a node configured for wireless communication. The node generally includes means for determining one or more beams to utilize for a beam management procedure using adaptive learning. The node generally includes means for performing the beam management procedure using the determined one or more beams.

Certain aspects provide a node configured for wireless communication. The node generally includes a memory. The node generally includes a processor coupled to the memory and configured to determine one or more beams to utilize for a beam management procedure using adaptive learning. The processor and memory are generally configured to perform the beam management procedure using the determined one or more beams.

Certain aspects provide a computer readable medium. The computer readable medium generally stores computer executable code. The computer executable code generally includes code for determining one or more beams to utilize for a beam management procedure using adaptive learning. The computer executable code generally includes code for performing the beam management procedure using the determined one or more beams.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
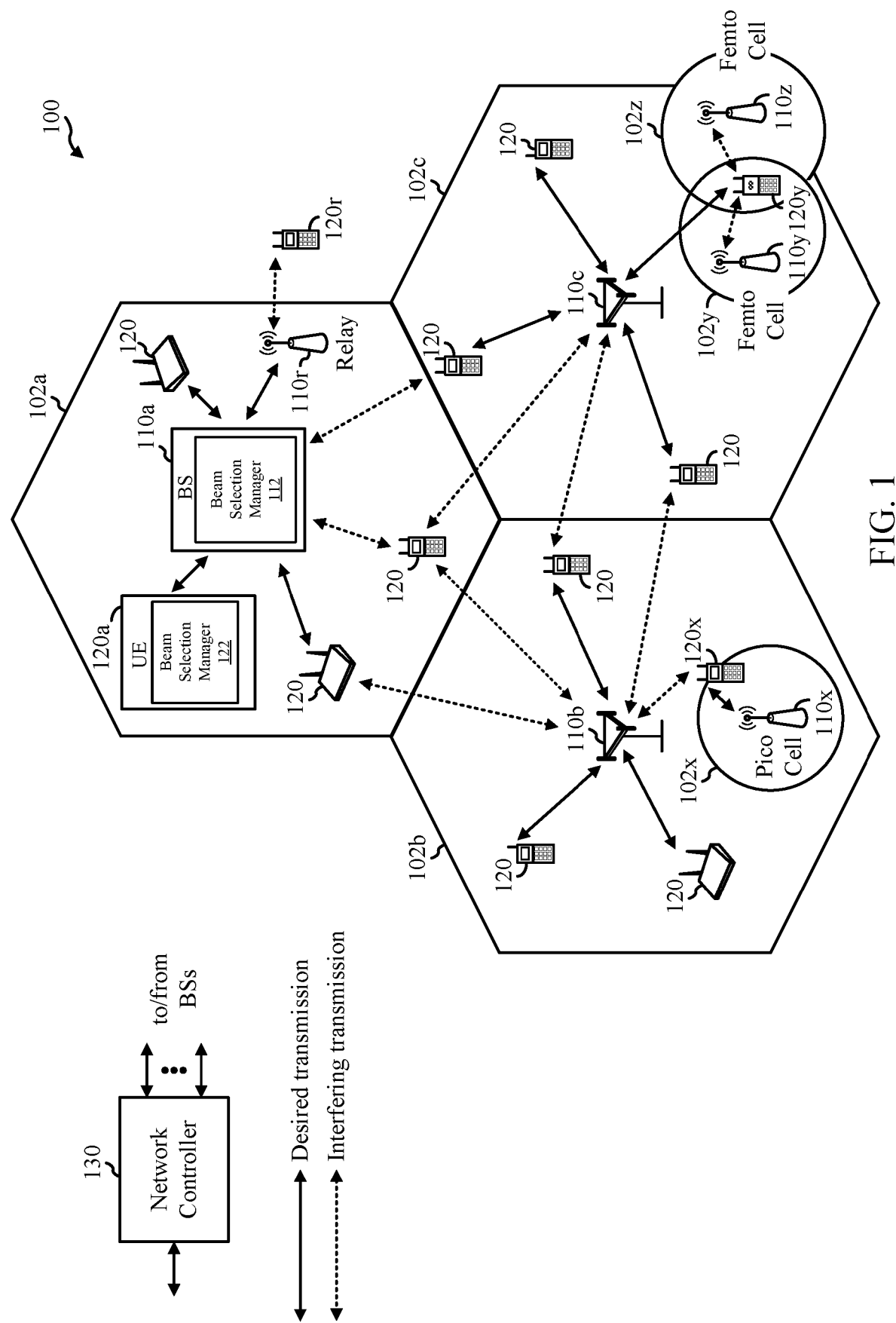
FIG. 1 is a block diagram conceptually illustrating an example telecommunications system, in accordance with certain aspects of the present disclosure.

Aspects of the present disclosure provide apparatus, methods, processing systems, and computer readable mediums for beam management using adaptive learning.

Certain systems, such as new radio systems (e.g., 5G NR), support millimeter wave (mmW) communication. In mmW communication, signals (referred to as mmW signals) used for communicating between devices may have a high carrier frequency (e.g., 25 GHz or beyond, such as within a 30 to 300 GHz frequency band) and may have a wavelength in a 1 mm to 10 mm range. Based on such characteristics of mmW signals, mmW communication can provide high speed (e.g., gigabit speed) communication between devices. However, compared to signals at lower frequencies, mmW signals may experience atmospheric effects and may not propagate well through materials. Thus, mmW signals may experience relatively higher path loss (e.g., attenuation or reduction of power density of the wave corresponding to the mmW signal) as it propagates as compared to lower frequency signals.

In order to overcome path loss, mmW communication systems utilize directional beam forming. Beam forming may involve the use of transmit (TX) beams and/or receive (RX) beams. TX beams correspond to transmitted mmW signals that are directed to have more power in a particular direction as opposed to other directions, such as toward a receiver. By directing the transmitted mmW signals toward a receiver, more energy of the mmW signal is directed to the receiver, thereby overcoming the higher path loss. RX beams correspond to techniques performed at the receiver to apply gain to signals received in a particular direction, while attenuating signals received in other directions. Use of RX beams also helps in overcoming higher path loss, for example, by increasing a signal to noise ratio (SNR) at which the desired mmW signal is received at the receiver. In some aspects, hybrid beam forming (e.g., signal processing in the analog and digital domains) may be used.

Accordingly, in certain aspects, for a particular transmitter to communicate with a particular receiver, the transmitter needs to select a TX beam to use, and the receiver needs to select a RX beam to use. The TX beam and RX beams used for communication is referred to as a beam pairing. In certain aspects, the RX and TX beams of a beam pairing are selected so as to provide sufficient coverage and/or capacity for communication.

In certain aspects, a beam management procedure may be used for selecting (e.g., initial selection, updated selection, refining to narrower beams within previously selected beams, etc.) a beam pairing. As will be discussed in more detail below with respect to FIGS. 2-4, a beam management procedure may involve taking measurements of signals using different RX and/or TX beams for reception/transmission and selecting beams for the beam pairing based on the measurements. For example, beams having the highest measured channel or link quality (e.g., throughput, SNR, etc.) among those measured may be selected.

In some cases, as discussed in more detail below with respect to FIGS. 2-4, there are a large number of RX and/or TX beams supported at the transmitter and/or the receiver, which may mean there are a large number of measurements that could be performed for the beam management procedure. In addition, the communication environment between a transmitter and receiver may vary at different times, such as due to blockers (e.g., when the user's hand blocks TX/RX beams at a transmitter/receiver, e.g., user equipment (UE), and/or an object blocks the line-of-sight (LOS) path between the transmitter and the receiver), movement and/or rotation of the transmitter/receiver, etc.

To account for such factors, in some cases, a beam management procedure is based on heuristics. A heuristic based beam management procedure attempts to predict realistic deployment scenarios of the transmitter and receiver and typically updates the beam management procedure used by the transmitter and receiver, such as using downloaded software patches, based on issues that are encountered (or expected) over time while the transmitter and receiver communicate. For example, a heuristic based beam management procedure may measure only certain RX and/or TX beams, instead of all of them of the transmitter and receiver, based on parameters of the transmitter and/or receiver.

To further improve beam management procedures, aspects of the present disclosure provide for using adaptive learning as part of a beam management procedure. For example, a UE (and/or a BS), acting as a transmitter and/or receiver, can use an adaptive learning based beam management algorithm that adapts over time based on learning. In particular, the learning may be based on feedback associated with previous beam selections for the UE and/or BS. The feedback may include an indication of the previous beam selections, as well as parameters associated with the previous beam selections. The algorithm can be initially trained based on feedback in a lab setting and then updated (e.g., continuously) using feedback while the UE and/or BS is in deployment. In some examples, the algorithm is a deep reinforcement learning based beam management algorithm that uses machine learning and an artificial neural network to update and apply a predictive model used for beam selection during the beam management procedure. In this manner, the adaptive learning based beam management algorithm learns from the users behaviors (e.g., frequently traversed paths, how the user holds the UE, etc.) and is, therefore, also personalized to the user.

The following description provides examples of using adaptive learning as part of a beam management procedure, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

FIG. 1 illustrates an example wireless communication network 100 in which aspects of the present disclosure may be performed. For example, the wireless communication network 100 may be a new radio system (e.g., a 5G NR network). The wireless communication network 100 may support mmW communication with beam forming. A node (e.g., a wireless node) in the wireless communication network 100, such as a UE 120a and/or a base station (BS) 110a, may be configured to perform a beam management procedure in order to select a beam pairing for communication with another node. For example, UE 120a and BS 110a can perform a beam management procedure to determine a receive beam of the UE 120a and a transmit beam of the BS 110a as a beam pairing, also referred to as a beam pair link (BPL) to be used for communications (e.g., downlink communications). As will be described in more detail herein, the UE 120a and/or BS 110a may use an adaptive learning based beam management procedure. The UE 120a and/or BS 110a can determine one or more beams to utilize for a beam management procedure using the adaptive learning. As shown in FIG. 1, a UE 120a has a beam selection manager 122. The beam selection manager 122 may be configured to use an adaptive learning based algorithm to determine/select the beams to use for the beam management procedure, according to one or more aspects described herein. As shown in FIG. 1, additionally or alternatively, a BS 110a can have a beam selection manager 112. The beam selection manager 112 may be configured to use an adaptive learning algorithm to determine/select the beams to use for the beam management procedure, according to aspects described herein. The UE 120a and/or BS 110a may then perform the beam management procedure using the determined one or more beams.

It should be noted that though certain aspects are described with respect to a beam management procedure being performed by a wireless node, certain aspects of such a beam management procedure may be performed by other types of nodes, such as a node connected by wired connection to a BS.

As illustrated in FIG. 1, the wireless communication network 100 may include a number of BSs 110a-z (each also individually referred to herein as BS 110 or collectively as BSs 110) and other network entities. A BS 110 may communicate with UEs 120a-y (each also individually referred to herein as UE 120 or collectively as UEs 120) in the wireless communication network 100. Each BS 110 may provide communication coverage for a particular geographic area. In some examples, the BSs 110 may be interconnected to one another and/or to one or more other BSs or network nodes (not shown) in wireless communication network 100 through various types of backhaul interfaces, such as a direct physical connection, a wireless connection, a virtual network, or the like using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The UEs 120 (e.g., 120x, 120y, etc.) may be dispersed throughout the wireless communication network 100, and each UE may be stationary or mobile.

A network controller 130 may be coupled to a set of BSs and provide coordination and control for these BSs. The network controller 130 may communicate with the BSs 110 via a backhaul. The BSs 110 may also communicate with one another (e.g., directly or indirectly) via wireless or wireline backhaul.

In some examples, the wireless communication network 100 (e.g., a 5G NR network) may support mmW communications. As discussed above, such systems using mmW communication may use beam forming to overcome high path-losses and a beam management procedure can be performed to select the beams used for the beam forming.

A BS-beam (e.g., TX or RX) and a UE-beam (e.g., the other of the TX or RX) form a BPL. Both the BS (e.g., BS 110a) and the UE (e.g., UE 120a) may determine (e.g., find/select) at least one adequate beam to form a communication link. For example, on the downlink, the BS 110a uses a transmit beam to transmit and the UE 120a uses a receive beam to receive downlink transmissions. The combination of the transmit beam and the receive beam forms the BPL. The UE 120a and BS 110a establish at least one BPL for the UE 120a to wireless communication network 100. In some examples, multiple BPLs (e.g., a set of BPLs) may be configured for communication between UE 120a and one or more BSs 110. Different BPLs may be used for different purposes, such as for communicating different channels, for communicating with different BSs, and/or as fallback BPLs in case an existing BPL fails.

In some examples, for initial cell acquisition, a UE (e.g., UE 120a) may search for a strongest signal corresponding to a cell associated with a BS (e.g., BS 110a) and the associated UE receive beam and BS transmit beam corresponding to a BPL used to receive/transmit the reference signal. After initial acquisition, the UE 120a may perform new cell detection and measurement. For example, the UE 120a may measure primary synchronization signal (PSS) and secondary synchronization signal (SSS) to detect new cells. As discussed in more detail below with respect to FIG. 3, the PSS/SSS may be transmitted by a BS (e.g., BS 110a) in different synchronization signal blocks (SSBs) across one or more synchronization signal (SS) burst sets. The UE 120a can measure the different SSBs, within a SS burst set, to perform a beam management procedure, as discussed further herein.

In 5G NR, the beam management procedure for determining of BPLs may be referred to as a P1 procedure. FIG. 2 illustrates an example P1 procedure 202. A BS 210 (e.g., such as the BS 110a) may send a measurement request to a UE 220 (e.g., such as the UE 120a) and may subsequently transmit one or more signals (sometimes referred to as the "P1-signal") to the UE 220 for measurement. In the P1 procedure 202, the BS 210 transmits the signal with beam forming in a different spatial direction (corresponding to a transmit beam 211, 212, ..., 217) in each symbol, such that several (e.g., most or all) relevant spatial locations of the cell of the BS 210 are reached. In this manner, the BS 210 transmits the signal using different transmit beams over time in different directions. In some examples, a SSB is used as the P1-signal. In some examples, channel state information reference signal (CSI-RS), demodulation reference signal (DMRS), or another downlink signal can be used as the P1-signal.

In the P1 procedure 202, to successfully receive at least a symbol of the P1-signal, the UE 220 finds (e.g., determines/selects) an appropriate receive beam (221, 222, ..., 226). Signals (e.g., SSBs) from multiple BSs can be measured simultaneously for a given signal index (e.g., SSB index) corresponding to a given time period. The UE 220 can apply a different receive beam during each occurrence (e.g., each symbol) of the P1-signal. Once the UE 220 succeeds in receiving a symbol of the P1-signal, the UE 220 and BS 210 have discovered a BPL (i.e., the UE RX beam used to receive the P1-signal in the symbol and the BS TX beam used to transmit the P1-signal in the symbol). In some cases, the UE 220 does not search all of its possible UE RX beams until it finds best UE RX beam, since this causes additional delay. Instead, the UE 220 may select a RX beam once the RX beam is "good enough", for example, having a quality (e.g., SNR) that satisfies a threshold (e.g., predefined threshold). The UE 220 may not know which beam the BS 210 used to transmit the P1-signal in a symbol; however, the UE 220 may report to the BS 210 the time at which it observed the signal. For example, the UE 220 may report the symbol index in which the P1-signal was successfully received to the BS 210. The BS 210 may receive this report and determine which BS TX beam the BS 210 used at the indicated time. In some examples, the UE 220 measures signal quality of the P1-signal, such as reference signal receive power (RSRP) or another signal quality parameter (e.g., SNR, channel flatness, etc.). The UE 220 may report the measured signal quality (e.g., RSRP) to the BS 210 together with the symbol index. In some cases, the UE 220 may report multiple symbol indices to the BS 210, corresponding to multiple BS TX beams.

As a part of a beam management procedure, the BPL used between a UE 220 and BS 110 may be refined/changed. For example, the BPL may be refined periodically to adapt to changing channel conditions, for example, due to movement of the UE 220 or other objects, fading due to Doppler spread, etc. The UE 220 can monitor the quality of a BPL (e.g., a BPL found/selected during the P1 procedure and/or a previously refined BPL) to refine the BPL when the quality drops (e.g., when the BPL quality drops below a threshold or when another BPL has a higher quality). In 5G NR, the beam management procedures for beam refinement of BPLs may be referred to as the P2 and P3 procedures to refine the BS-beam and UE-beam, respectively, of an individual BPL.

Figure 2:
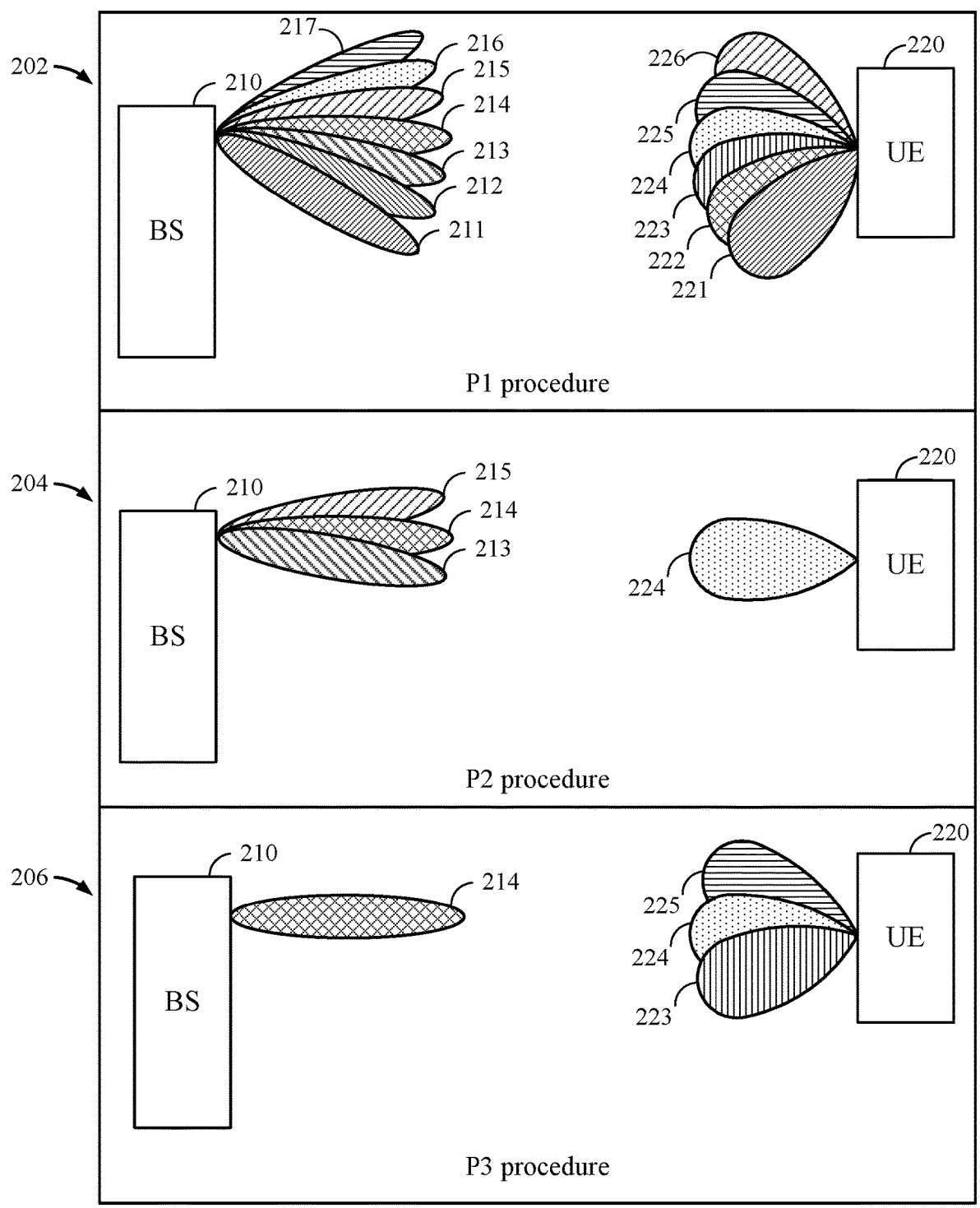
FIG. 2 illustrates example beam management procedures, in accordance with certain aspects of the present disclosure.
Figure 3:
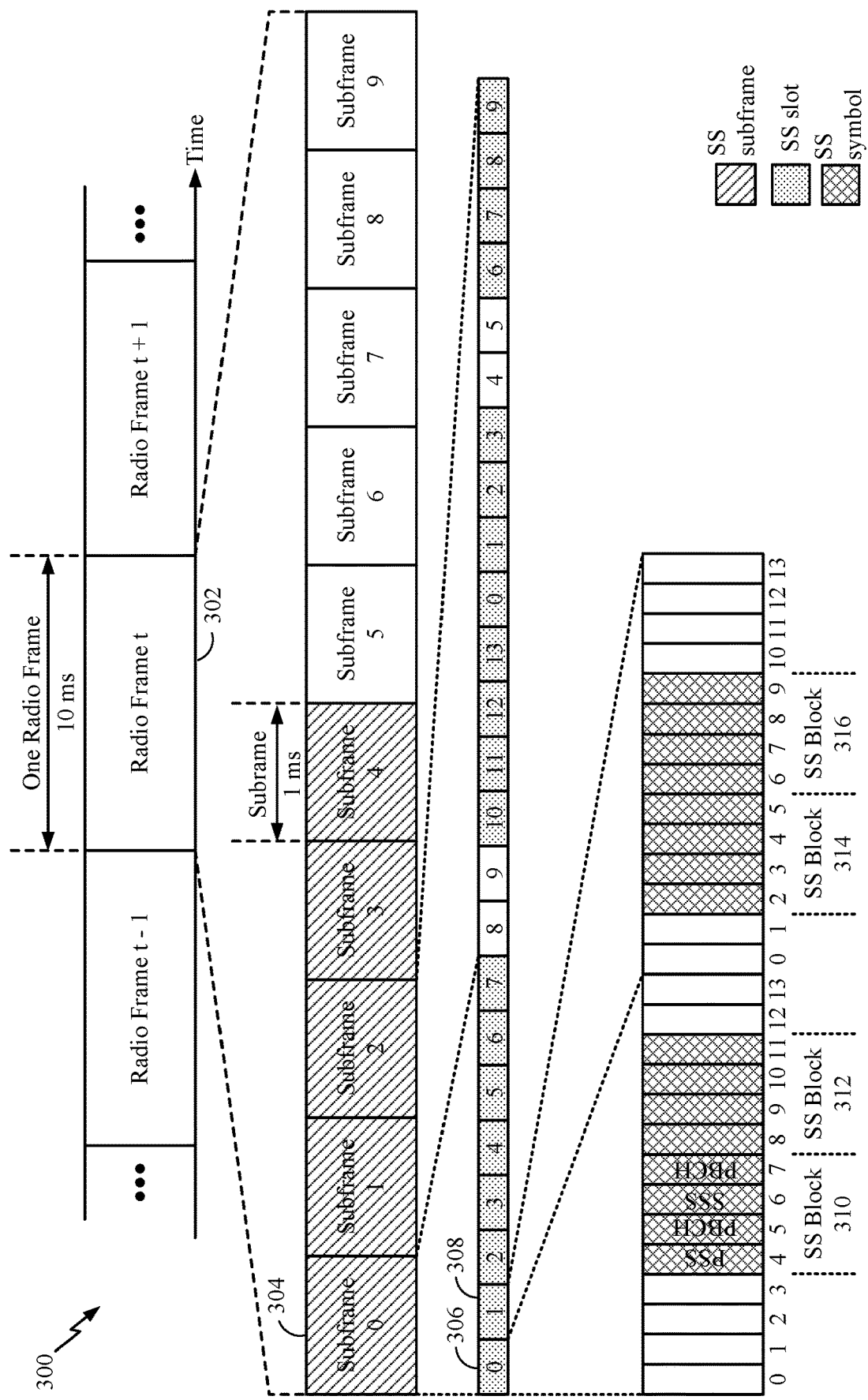
FIG. 3 illustrates example synchronization signal block (SSB) locations within an example half-frame, in accordance with certain aspects of the present disclosure.

FIG. 2 illustrates an example P2 procedure 204 and P3 procedure 206. As shown in FIG. 2, for the P2 procedure 204, the BS 210 transmits symbols of a signal with different BS-beams (e.g., TX beams 215, 214, 213) that are spatially close to the BS-beam of the current BPL. For example, the BS 210 transmits the signal in different symbols using neighboring TX beams (e.g., beam sweeps) around the TX beam of the current BPL. As shown in FIG. 2, the TX beams used by the BS 210 for the P2 procedure 204 may be different from the TX beams used by the BS 210 for the P1 procedure 202. For example, the TX beams used by the BS 210 for the P2 procedure 204 may be spaced closer together and/or may be more focused (e.g., narrower) than the TX beams used by the BS 210 for the P1 procedure. During the P2 procedure 204, the UE 220 keeps its RX beam (e.g., RX beam 224) constant. The UE 220 may measure the signal quality (e.g., RSRP) of the signal in the different symbols and indicate the symbol in which the highest signal quality was measured. Based on the indication, the BS 210 can determine the strongest (e.g., best, or associated with the highest signal quality) TX beam (i.e., the TX beam used in the indicated symbol). The BPL can be refined accordingly to use the indicated TX beam.

As shown in FIG. 2, for the P3 procedure 206, the BS 220 maintains a constant TX beam (e.g., the TX beam of the current BPL) and transmits symbols of a signal using the constant TX beam (e.g., TX beam 214). During the P3 procedure 206, the UE 220 scans the signal using different RX beams (e.g., RX beams 223, 224, 225) in different symbols. For example, the UE 220 may perform a sweep using neighboring RX beams to the RX beam in the current BPL (i.e., the BPL being refined). The UE 220 may measure the signal quality (e.g., RSRP) of the signal for each RX beam and identify the strongest UE RX beam. The UE 220 may use the identified RX beam for the BPL. The UE 220 may report the signal quality to the BS 210.

As discussed above, in some examples, measurement of SSBs may be used for beam management. FIG. 3 illustrates example SSB locations within an example NR radio frame format 302. The transmission timeline for each of the downlink and uplink may be partitioned into units of radio frames. As shown in FIG. 3, the example 10 ms NR radio frame format 302 can include ten 1 ms subframes (subframes with indices 0, 1, ..., 9). In NR, the basic transmission time interval (TTI) may be referred to as a slot. In NR, a subframe may contain a variable number of slots (e.g., 1, 2, 4, 8, 16, ... slots) depending on the subcarrier spacing (SCS). NR may support a base SCS of 15 KHz and other SCS may be defined with respect to the base SCS (e.g., 30 kHz, 60 kHz, 120 kHz, 240 kHz, etc.). In the example shown in FIG. 3, the SCS is 120 kHz. As shown in FIG. 3, the subframe 304 (subframe 0) contains 8 slots (slots 0, 1, ..., 7) with a 0.125 ms duration. The symbol and slot lengths scale with the subcarrier spacing. Each slot may include a variable number of symbol (e.g., OFDM symbols) periods (e.g., 7 or 14 symbols) depending on the SCS. For the 120 kHz SCS shown in FIG. 3, each of the slot 306 (slot 0) and slot 308 (slot 1) includes 14 symbol periods (slots with indices 0, 1, ..., 13) with a 0.25 ms duration.

In some examples, the SSB can be transmitted up to sixty-four times with up to sixty-four different beam directions. The up to sixty-four transmissions of the SSB are referred to as the SS burst set. SSBs in an SS burst set may be transmitted in the same frequency region, while SSBs in different SS bursts sets can be transmitted in different frequency regions. In the example shown in FIG. 3, in the subframe 304, SSB is transmitted in each of the slots (slots 0, 1, ..., 7). In the example shown in FIG. 3, in the slot 306 (slot 0), an SSB 310 is transmitted in the symbols 4, 5, 6, 7 and an SSB 312 is transmitted in the symbols 8, 9, 10, 11, and in the slot 308 (slot 1), an SSB 314 is transmitted in the symbols 2, 3, 4, 5 and an SSB 316 is transmitted in the symbols 6, 7, 8, 9, and so on. The SSB may include a PSS, a SSS, and a two symbol physical broadcast channel (PBCH). The PSS and SSS may be used by UEs for the cell search and acquisition. For example, the PSS may provide half-frame timing, the SSS may provide the control protocol (CP) length and frame timing, and the PSS and SSS may provide the cell identity. The PBCH carries some basic system information, such as downlink system bandwidth, timing information within radio frame, SS burst set periodicity, system frame number, etc.

Figure 4:
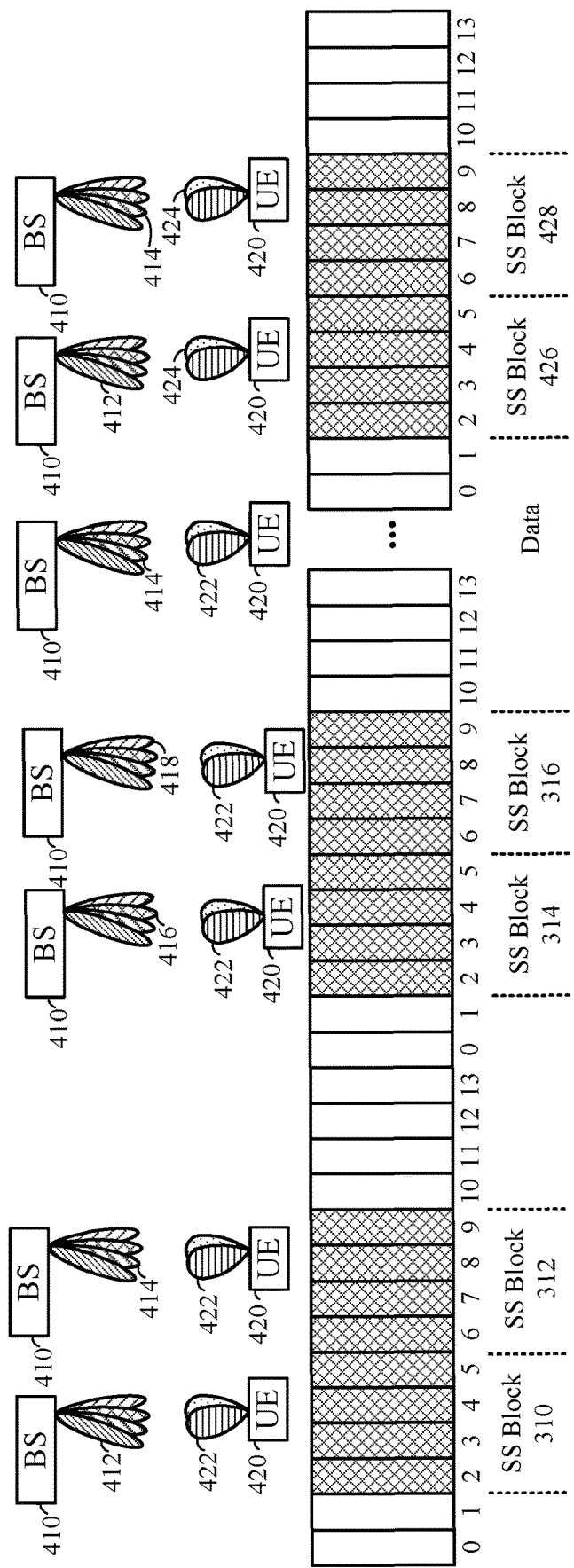
FIG. 4 illustrates example transmit and receive beams for SSB measurement, in accordance with certain aspects of the present disclosure.

As shown in FIG. 4, the SSBs can be used for measurements using different transmit and receive beams, for example accordingly to a beam management procedure such as the P1 procedure 202 shown in FIG. 2. FIG. 4 illustrates an example for a BS 410 (e.g., such as the BS 110a) that uses 4 TX beams and a UE 420 (e.g., such as the UE 120a) that uses 2 RX beams. For each SSB, the BS 410 uses a different TX beam BS to transmit the SSB. As shown in FIG. 4, the UE 420 can scan its RX beam 422 while the BS 410 transmits SSBs 310, 312, 314, 316 sweeping its four TX beams 412, 414, 416, 418 respectively. A BPL may be identified and used for data communication over a period as discussed. As shown in FIG. 4, the BS 410 uses the TX beam 414 and the UE 420 uses the RX beam 422 for data communication for a period. The UE 410 may then scan its RX beam 424 while the BS 410 transmits SSBs 426, 428 sweeping its TX beams 412, 414, and so on.

As can be seen, as the number of TX/RX beams increases, the number of scans for the UE to scan each of its RX beams over each TX beam can become large. Power consumption may scale linearly with the number of measured SSBs. Thus, the time and power overhead associated with beam management may become large if all beams are actually scanned.

Thus, aspects of the present disclosure provide techniques to assist a node when performing measurements of other nodes when using beam forming, for example by using adaptive learning, that may reduce the number of measurements used for a beam management procedure, and thus reduce power consumption.

Example Beam Management Procedure Using Adaptive Learning

A non-adaptive algorithm is deterministic as a function of its inputs. If the algorithm is faced with exactly the same inputs at different times, then its outputs will be exactly the same. An adaptive algorithm is one that changes its behavior based on its past experience. This means that different devices using the adaptive algorithm may end up with different algorithms as time passes.

According to certain aspects, beam management procedures may be performed using an adaptive learning-based beam management algorithm. Thus, over the time, the beam algorithm changes (e.g., adapts, updates) based on new learning. The beam management procedure may be used for initial acquisition, cell discovery after initial acquisition, and/or determining BPLs for strongest cells detected by a UE. For example, the adaptive learning can be used to build a UE codebook, the UE codebook indicating beams to use (e.g., measure) for the beam management procedure. In some examples, the adaptive-learning may be used to select UE receive beams to use for discovering BPLs. The adaptive learning may be used to intelligently select which UE receive beams to use to measure signals, based on training and experience, such that fewer beams may be measured, while still finding a suitable BPL (e.g., that satisfies a threshold signal quality).

Figure 5:
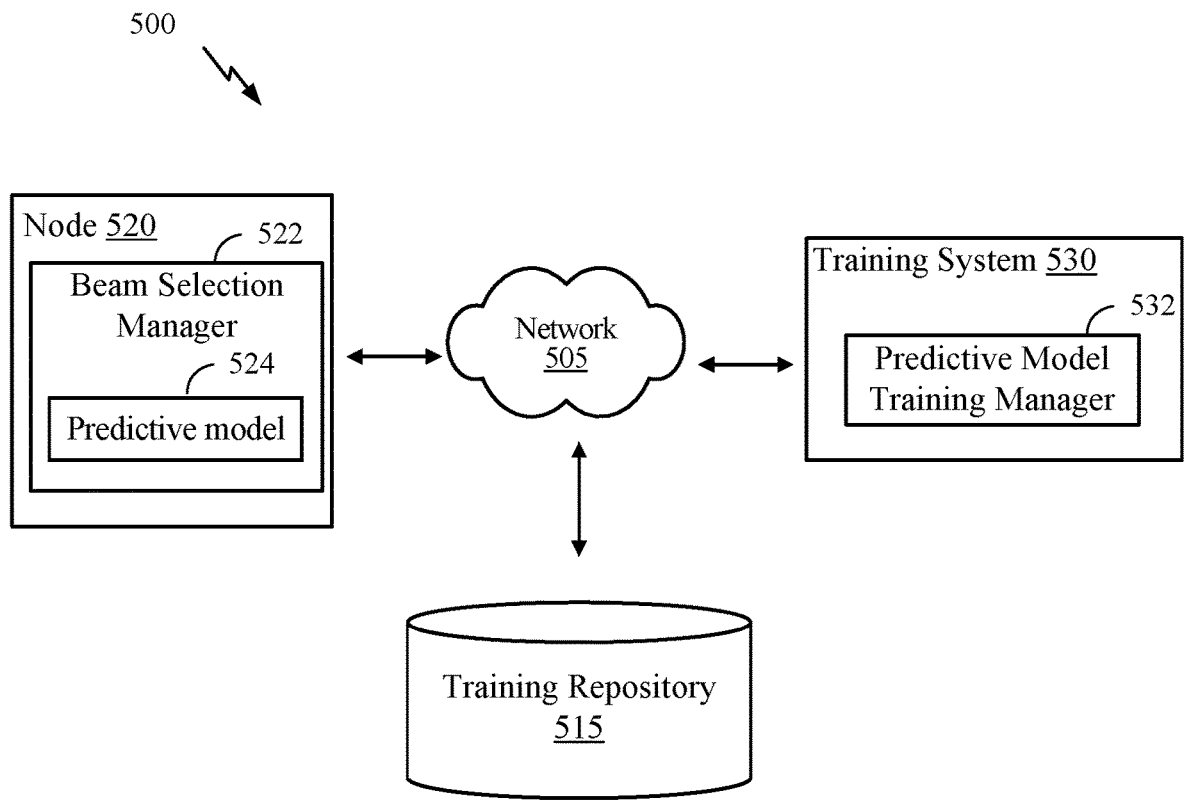
FIG. 5 illustrates an example networked environment in which a predictive model is used for beam management, according with certain aspects of the present disclosure.

In some examples, the adaptive learning-based beam management involves training a model, such as a predictive model. The model may be used during the beam management procedure to select which UE receive beams to use to measure signals. The model may be trained based on training data (e.g., training information), which may include feedback, such as feedback associated with the beam management procedure. FIG. 5 illustrates an example networked environment 500 in which a predictive model 524 is used for beam management, according with certain aspects of the present disclosure.

As shown in FIG. 5, networked environment 500 includes a node 520, a training system 530, and a training repository 515, communicatively connected via network 505. The node 520 may be a UE (e.g., such as the UE 120a in the wireless communication network 100) or a BS (e.g., such as the BS 110a in the wireless communication network 100). The network 505 may be a wireless network such as the wireless communication network 100, which may be a 5G NR network. While the training system 530, node 520, and training repository 515 are illustrated as separate components in FIG. 5, it should be recognized by one of ordinary skill in the art that training system 530, node 520, and training repository 515 may be implemented on any number of computing systems, either as one or more standalone systems or in a distributed environment.

The training system 530 generally includes a predictive model training manager 532 that uses training data to generate a predictive model 524 for beam management. The predictive model 524 may be determined based on the information in the training repository 515.

The training repository 515 may include training data obtained before and/or after deployment of the node 520. The node 520 may be trained in a simulated communication environment (e.g., in field testing, drive testing) prior to deployment of the node 520. For example, various beam management procedures (e.g., various selections of UE RX beams for measuring signals) can be tested in various scenarios, such as at different UE speeds, with the UE stationary, at various rotations of the UE, with various BS deployments/geometries, etc., to obtain training information related to the beam management procedure. This information can be stored in the training repository 515. After deployment, the training repository 515 can be updated to include feedback associated with beam management procedures performed by the node 520. The training repository can also be updated with information from other BSs and/or other UEs, for example, based on learned experience by those BSs and UEs, which may be associated with beam management procedures performed by those BSs and/or UEs.

The predictive model training manager 532 may use the information in the training repository 515 to determine the predictive model 524 (e.g., algorithm) used for beam management, such as to select UE RX beams for measuring signals. As discussed in more detail herein, the predictive model training manager 532 may use various different types of adaptive learning to form the predictive model 524, such as machine learning, deep learning, reinforcement learning, etc. The training system 530 may adapt (e.g., update/refine) the predictive model 524 over time. For example, as the training repository is updated with new training information (e.g., feedback), the model 524 is updated based on the new learning/experience.

The training system 530 may be located on the node 520, on a BS in the network 505, or on a different entity that determines the predictive model 524. If located on a different entity, then the predictive model 524 is provided to the node 520.

The training repository 515 may be a storage device, such as a memory. The training repository 515 may be located on the node 520, the training system 530, or another entity in the network 505. The training repository 515 may be in cloud storage. The training repository 515 may receive training information from the node 520, entities in the network 505 (e.g., BSs or UEs in the network 505), the cloud, or other sources.

As described above, the node 520 is provided with (or generates, e.g., if the training system 530 is implemented in the node 520) the predictive model 524. As illustrated, the node 520 may include a beam selection manager 522 configured to use the predictive model 524 for beam management (e.g., such as one of the beam management procedures discussed above with respect to FIG. 2). In some examples, the node 520 utilizes the predictive model 524 to build a UE codebook and/or to determine/select beams from the UE codebook to use for a beam management procedure. The predictive model 524 is updated as the training system 530 adapts the predictive model 524 with new learning.

Thus, the beam management algorithm, using the predictive model 524, of the node 520 is adaptive learning-based, as the algorithm used by the node 520 changes over time, even after deployment, based on experience/feedback the node 520 obtains in deployment scenarios (and/or with training information provided by other entities as well).

According to certain aspects, the adaptive learning may use any appropriate learning algorithm. As mentioned above, the learning algorithm may be used by a training system (e.g., such as the training system 530) to train a predictive model (e.g., such as the predictive model 524) for an adaptive-learning based beam management algorithm used by a device (e.g., such as the node 520) for a beam management procedure. In some examples, the adaptive learning algorithm is an adaptive machine learning algorithm, an adaptive reinforcement learning algorithm, an adaptive deep learning algorithm, an adaptive continuous infinite learning algorithm, or an adaptive policy optimization reinforcement learning algorithm (e.g., a proximal policy optimization (PPO) algorithm, a policy gradient, a trust region policy optimization (TRPO) algorithm, or the like). In some examples, the adaptive learning algorithm is modeled as a partially observable Markov Decision Process (POMDP). In some examples, the adaptive learning algorithm is implemented by an artificial neural network (e.g., a deep Q network (DQN) including one or more deep neural networks (DNNs)).

In some examples, the adaptive learning (e.g., used by the training system 530) is performed using a neural network. Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

In some examples, the adaptive learning (e.g., used by the training system 530) is performed using a deep belief network (DBN). DBNs are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input could be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

In some examples, the adaptive learning (e.g., used by the training system 530) is performed using a deep convolutional network (DCN). DCNs are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods. DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

An artificial neural network, which may be composed of an interconnected group of artificial neurons (e.g., neuron models), is a computational device or represents a method performed by a computational device. These neural networks may be used for various applications and/or devices, such as Internet Protocol (IP) cameras, Internet of Things (IoT) devices, autonomous vehicles, and/or service robots. Individual nodes in the artificial neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation." The weight values may initially be determined by an iterative flow of training data through the network (e.g., weight values are established during a training phase in which the network learns how to identify particular classes by their typical input data characteristics).

Different types of artificial neural networks can be used to implement adaptive learning (e.g., used by the training system 530), such as recurrent neural networks (RNNs), multilayer perceptron (MLP) neural networks, convolutional neural networks (CNNs), and the like. RNNs work on the principle of saving the output of a layer and feeding this output back to the input to help in predicting an outcome of the layer. In MLP neural networks, data may be fed into an input layer, and one or more hidden layers provide levels of abstraction to the data. Predictions may then be made on an output layer based on the abstracted data. MLPs may be particularly suitable for classification prediction problems where inputs are assigned a class or label. Convolutional neural networks (CNNs) are a type of feed-forward artificial neural network. Convolutional neural networks may include collections of artificial neurons that each has a receptive field (e.g., a spatially localized region of an input space) and that collectively tile an input space. Convolutional neural networks have numerous applications. In particular, CNNs have broadly been used in the area of pattern recognition and classification. In layered neural network architectures, the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

In some examples, when using an adaptive machine learning algorithm, the training system 530 generates vectors from the information in the training repository 515. In some examples, the training repository 515 stores vectors. In some examples, the vectors map one or more features to a label. For example, the features may correspond to various deployment scenario patterns discussed herein, such as the UE mobility, speed, rotation, channel conditions, BS deployment/geometry in the network, etc. The label may correspond to the predicted optimal beam selection (e.g., of RX beams) associated with the features for performing a beam management procedure. The predictive model training manager 532 may use the vectors to train the predictive model 524 for the node 520. As discussed above, the vectors may be associated with weights in the adaptive learning algorithm. As the learning algorithm adapts (e.g., updates), the weights applied to the vectors can also be changed. Thus, when the beam management procedure is performed again, under the same features (e.g., under the same set of conditions), the model may give the node 520 a different result (e.g., a different beam selection).

Figure 6:
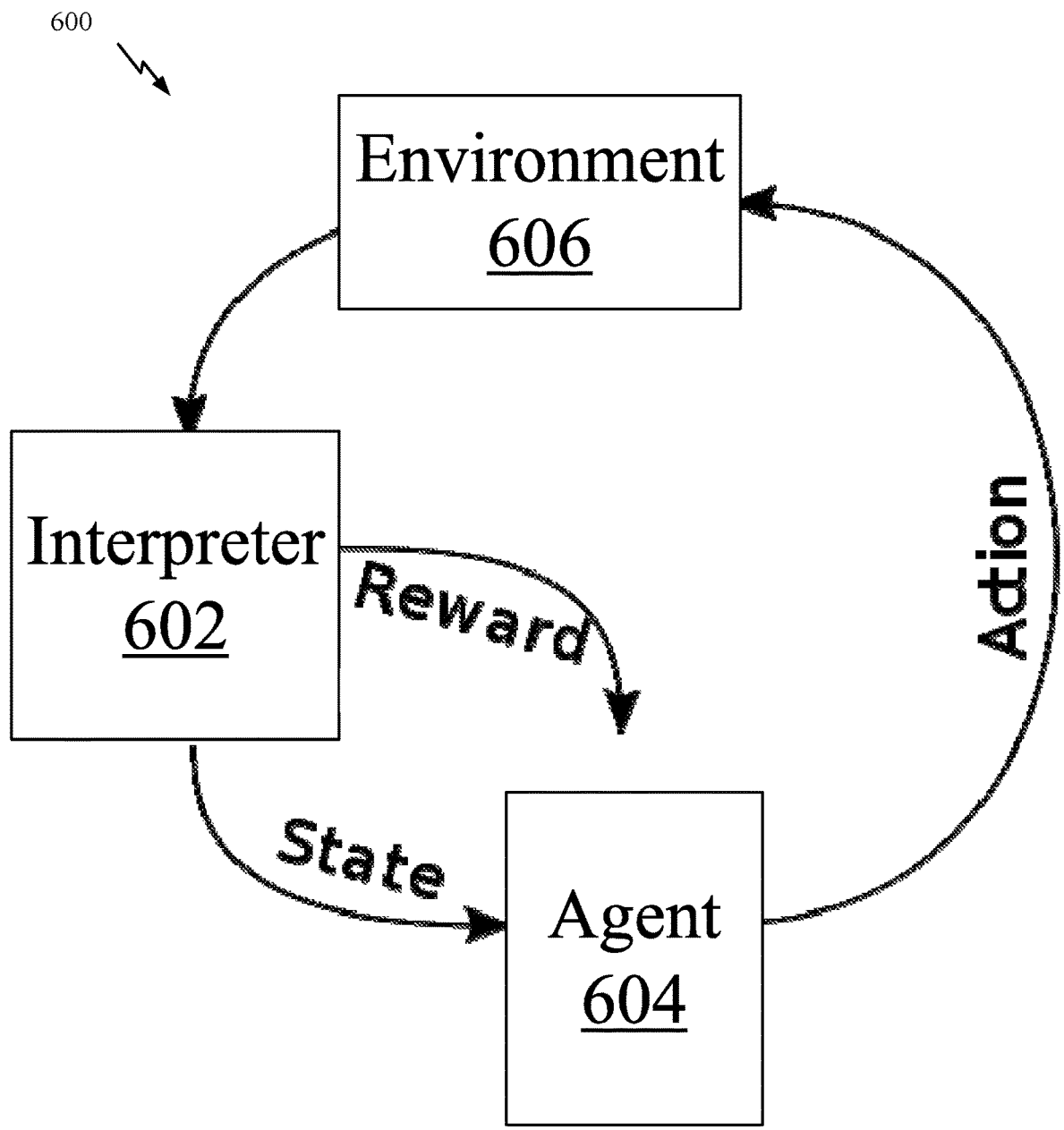
FIG. 6 conceptually illustrates an example reinforcement learning model, in accordance with certain aspects of the present disclosure.

FIG. 6 conceptually illustrates an example reinforcement learning model. Reinforcement learning may be a semi-supervised learning model in machine learning. Reinforcement learning allows an agent 604 (e.g., node 520 and/or training system 530) to take actions (e.g., beam selection) based on states (e.g., RSPRs of SSBs using different beams) observed by an interpreter 602 (e.g., such as the node 520) and interact with an environment 606 (e.g., the current deployment scenario) so as to maximize the total rewards (e.g., physical downlink shared channel (PDSCH) throughput using selected beams) which may be observed by the interpreter 602 and fed back to the agent 604 as reinforcement. In some examples, the agent 604 and interpreter 602 may be implemented as the same or separate components device that may perform various functions of the node 520, training system 530, and/or training repository 515.

In some examples, reinforcement learning is modeled as a Markov Decision Process (MDP). A MDP is a discrete, time stochastic, control process. The MDP provides a mathematical framework for modeling decision making in situations where outcomes may be partly random and partly under the control of a decision maker. In MDP, at each time step, the process is in a state, of a set of S finite states, and the decision maker may choose any action, of a finite set of actions A, that is available in that state. The process responds at the next time step by randomly moving into a new state, and giving the decision maker a corresponding reward, where $R_a(s,s')$ is the immediate reward (or expected immediate reward) after transitioning from state s to state s'. The probability that the process moves into its new state is influenced by the chosen action, for example, according to a state transition function. The state transition may be given by $P_a(s,s') \approx \Pr(s_{t+1}=s'|s_t=s, \alpha_t=\alpha)$.

A MDP seeks to find a policy for the decision: a function of π that specifies the action π(s) that the decision maker will choose when in state s. The goal is to choose a policy π that maximizes the rewards. For example, a policy that maximizes a cumulative function of the rewards, such as a discounted summation. The following shows an example function:

$$\Sigma_{t=0}^{\infty} \gamma^t R_{\alpha t}(s_t, s_{t+1}), \text{ where}$$

$\alpha_t = \pi(s_t)$, the action given by the policy, and γ is the discount factor and satisfies $0 \leq \gamma \leq 1$.

The solution for the MDP is a policy which describes the best action for each state in the MDP, for example that maximizes the expected discounted reward.

In some examples, a partially observable MDP is used (POMDP). POMDP may be used when the state may not be known when the action is taken, and, therefore, the probabilities and/or rewards may be unknown. For POMDP, reinforcement learning may be used. The following function may be defined:

$$Q(s,a) = \Sigma_s P_\alpha(s,s')(R_\alpha(s,s') + \gamma V(s')).$$

Experience during learning may be based on (s,a) pairs together with the outcome s'. For example, if the node was previously in a state s, and made a beam selection a, and achieved a throughput s'. In this example, the node may update the array Q directly based on the learned experience. This may be referred to as Q-learning. In some examples, the learning algorithm may be continuous.

In some examples, for the adaptive learning-based beam management algorithm, the state may correspond to the M strongest beam quality measurements (e.g., reference signal received power (RSRP) of SSBs on different beams) in the environment (e.g., a current deployment scenario of a UE), which include the conditions discussed herein including UE mobility, BS deployment pattern (e.g., geometry), blockers, etc. The action may correspond to the beam selection. The reward may be the throughput achieved using the beam selection, such a PDSCH throughput. The reward could be another parameter, such as spectral efficiency for example. Thus, using such an MDP, at a given time, in a given state, the node can employ the algorithm to find the policy that specifies the beam selection to maximize the throughput. As discussed above, the reward may be discounted. For beam management, the reward may be offset by some penalty as a function of measured SSBs, for example, to optimize for minimum power.

Referring back to the example networked environment 500 in FIG. 5 and reinforcement learning model 600 in FIG. 6, in some examples, the predictive model training manager 532 or agent 604 may use reinforcement learning for a predictive model (e.g., the predictive model 524) to determine the policy (e.g., the MDP solution). The node 520 or agent 604 may take an action, such as a beam selection for a beam management procedure, based on the policy given by the predictive model (e.g., predictive model 524) for a current state (e.g., observed by node 520 or interpreter 602), at a given time, in the environment (e.g., environment 606). The reinforcement learning algorithm and predictive model may be updated/adapted based on learned experience (e.g., which may be stored in the training repository 515).

The framework of reinforcement learning provides the tools to optimally solve the POMDP. The learning changes the weights of the multi-level perceptron (e.g., the neural net) that decides on the next action to take. The algorithm in deep ML is encoded in the neural net weights. Thus, changing the weights changes the algorithm.

Figure 7:
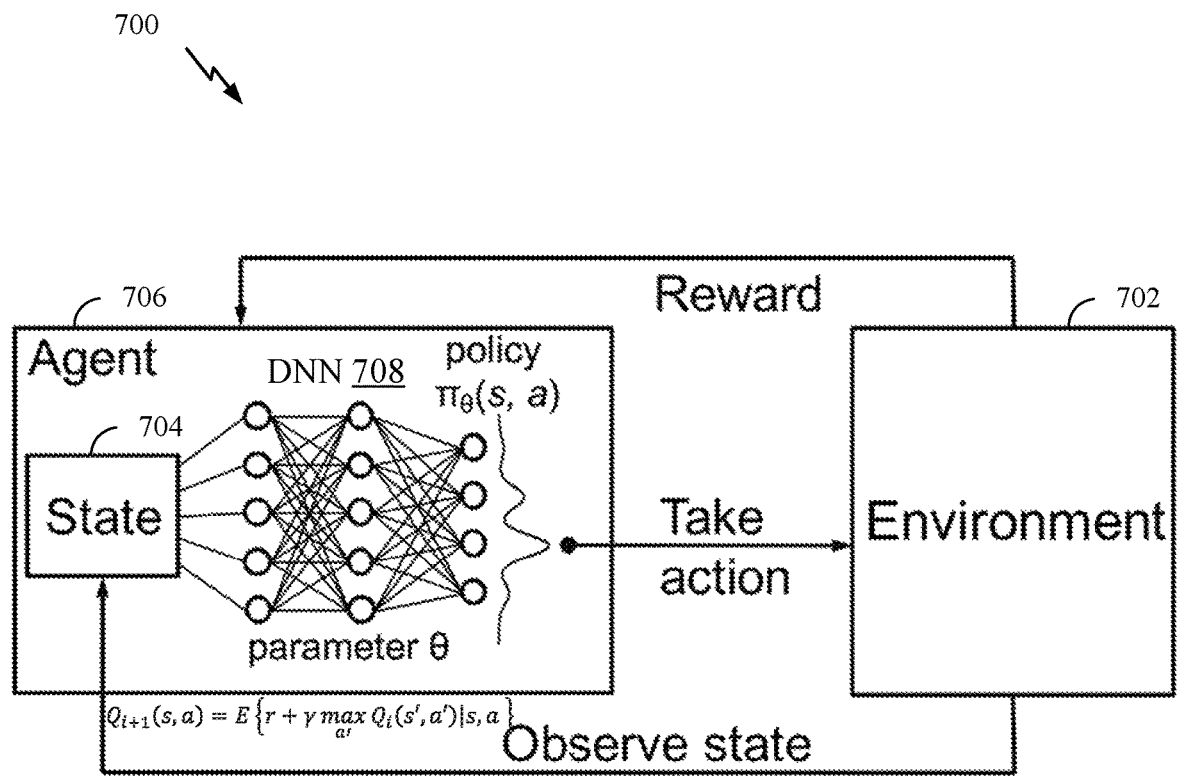
FIG. 7 conceptually illustrates an example deep Q network (DQN) learning model, in accordance with certain aspects of the present disclosure.

In some examples, the adaptive learning-based beam management uses an adaptive deep learning algorithm. The adaptive deep learning algorithm may be a deep Q network (DQN) algorithm implemented by a neural network. FIG. 7 conceptually illustrates an example DQN learning model 700, in accordance with certain aspects of the present disclosure. As shown in FIG. 7, an agent 706 (e.g., such as the agent 604 or node 520) includes an artificial neural network, for example, such as a deep neural network (DNN) 708 as shown in the example in FIG. 7. For a current environment 702 (e.g., such as the environment 606), which may be a real deployment scenario involving a UE (e.g., UE 120*a*) and a BS (e.g., BS 110*a*) and various conditions as described herein, the agent 706 observes a state 704 ($s$). For example, the observed state may be the M strongest RSRPs corresponding to measured SSBs using different beams for a beam management procedure.

In some examples, the adaptive learning algorithm is modeled as a POMDP with reinforcement learning. A POMDP can be used when the state may not be known when the action is taken, and, therefore, the probabilities and/or rewards may be unknown. For POMDP, reinforcement learning may be used. The Q array may be defined as:

$$Q_{i+1}(s,a)=E\{r+\gamma \max Q_i(s',a')|s,a\}.$$

As shown in FIG. 7, for a given state 704 s (e.g., the RSRPs) and possible actions a, are input to the DNN 708, which can perform the algorithm to output a value (e.g., parameter θ) per possible action a, to determine the policy (e.g., $\pi_\theta(s,a)$) based on a maximal value. The policy and corresponding action is taken and applied to the environment. For example, the agent 706 makes a beam selection and then uses the selected beams in the environment 702. As shown in FIG. 7, the reward for the action is fed back to the agent 706 to update the algorithm. For example, the throughput achieved with the selected beams may be fed back. Based on the feedback, the agent 706 updates the DNN 708 (e.g., by changing weights associated with vectors).

According to certain aspects, the adaptive learning based-beam management allows for continuous infinite learning. In some examples, the learning may be augmented with federated learning. For example, while some machine learning approaches use a centralized training data on a single machine or in a data center; with federated learning, the learning may be collaborative involving multiple devices to form the predictive model. With federated learning, training of the model can be done on the device, with collaborative learning from multiple devices. For example, referring back to FIGS. 5-7, the node 520, agent 604, and agent 706, can receive training information and/or updated trained models, from various different devices.

In an illustrative example, multiple different UEs' beam management algorithm can be trained in multiple different scenarios of operation, for example, using deep reinforcement learning. The output of the training from the different UEs can be combined to train the beam management algorithm for the UEs. Once the beam management algorithm is trained, the algorithm may continue learning based on actual deployment scenarios. As discussed above, the state may be the best M RSRP measurements at the current time; the reward may be the measured PDSCH throughput for the current best beam pair; and the action may be the selection of which beam pair/pairs to measure.

According to certain aspects, the adaptive learning based-beam management allows for personalization to the user and for design robustness. In some examples, the adaptive learning based-beam management may be optimized. For example, as the user (e.g., such as the node 520) visits/traverses a path (e.g., an environment) the adaptive algorithm learns and optimizes to that environment. Also, different BS vendors can have a different beam management implementation, such as how the SSBs are transmitted. For example, some BS vendors transmit many narrow TX beams, which will serve as the data beams as well; and other vendors transmit a few wide beams and use beam refinement (e.g., P2 and/or P3 procedure) to narrow and track data beams. In some examples, the adaptive learning based-beam management may be optimized to the particular beam management implementation for a vendor. In some examples, the adaptive learning based-beam management may be optimized to the user, for example, the way the user holds/uses the UE affects the possible blockage of its beams.

Figure 8:
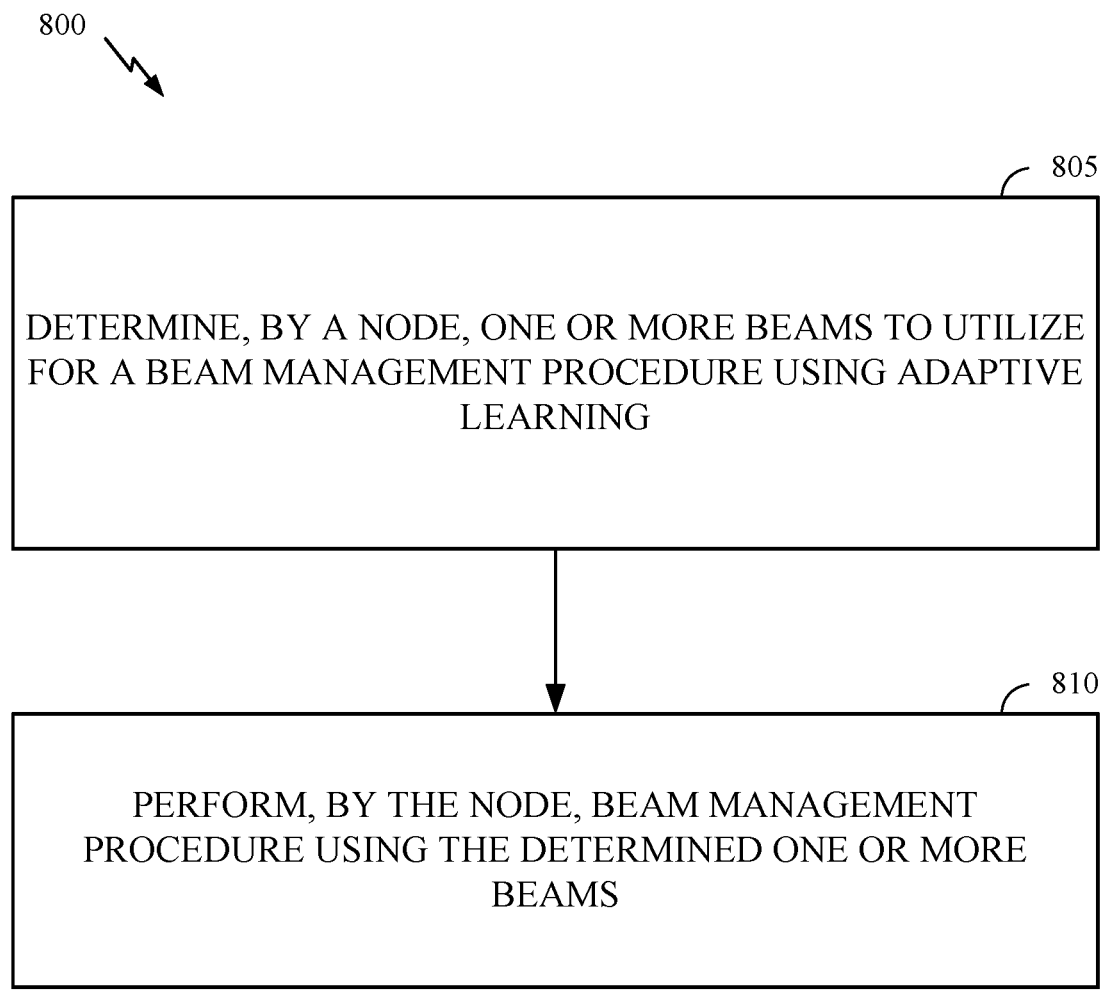
FIG. 8 is a flow diagram illustrating example operations for wireless communication by a node, in accordance with certain aspects of the present disclosure.

FIG. 8 is a flow diagram illustrating example operations 800 for wireless communication, in accordance with certain aspects of the present disclosure. The operations 800 may be performed, for example, by a node (e.g., such as the node 520, which may be a BS 110*a* or a UE 120*a* in the wireless communication network 100 which may be wireless nodes). Operations 800 may be implemented as software components that are executed and run on one or more processors (e.g., controller/processor 1240, 1280 of FIG. 12). Further, the transmission and reception of signals by the node in operations 800 may be enabled, for example, by one or more antennas (e.g., antennas 1234, 1252 of FIG. 12). In certain aspects, the transmission and/or reception of signals by the node may be implemented via a bus interface of one or more processors (e.g., controller/processor 1240, 1280) obtaining and/or outputting signals.

The operations 800 may begin, at 805, by determining one or more beams to utilize for a beam management procedure using adaptive learning.

At 810, the node performs the beam management procedure using the determined one or more beams.

According to certain aspects, the adaptive learning uses an adaptive learning algorithm. The adaptive learning algorithm may be updated (e.g., adapted) based on feedback and/or training information. The node may perform another beam management procedure using the updated adaptive learning algorithm. The feedback may be feedback associated with the beam management procedure. For example, after performing the beam management procedure using the determined one or more beams, the node may receive feedback regarding a throughput achieved, and the beam management algorithm may be updated based on the feedback. In some examples, the feedback may be associated with a beam management performed by a different device, such as a different node.

Figure 9:
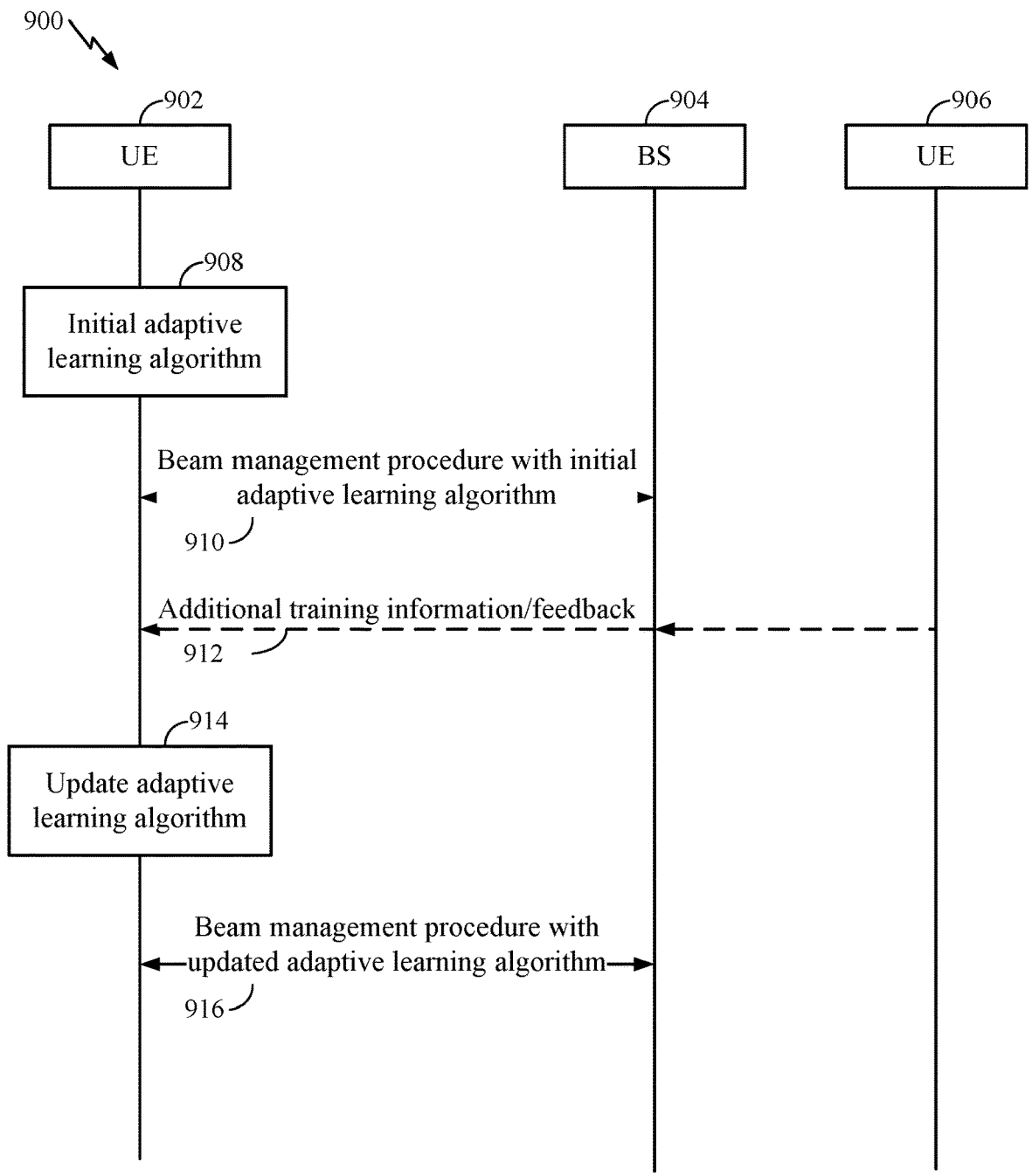
FIG. 9 is an example call flow diagram illustrating example signaling for beam management using adaptive learning, in accordance with certain aspects of the present disclosure.

FIG. 9 is an example call flow diagram illustrating example signaling 900 for beam management using adaptive learning, in accordance with certain aspects of the present disclosure. As shown in FIG. 9, a UE 902 (e.g., such as the UE 120*a*) may have an initial learning algorithm (e.g., including a predictive model) at 908. In some examples, the UE 902 may train the initial learning algorithm or the learning algorithm may be trained and then provided to the UE 902. At 910, the UE 902 performs a beam management procedure (e.g., such as the P1 procedure 202) with one or more BSs 904. For example, the UE 902 may determine beams to use and/or measure using the adaptive learning algorithm. At 912, the UE 902 receives additional training information and/or feedback. For example, the UE 902 may receive feedback from the BS 904 (e.g., such as the BS 110a) regarding the beam management procedure performed at 910, such as PDSCH throughput achieved using the selected beams. Additionally or alternatively, the UE 902 may receive additional training information from the BS 904 and/or another UE 906. At 914, the UE 902 determines an updated adaptive learning algorithm based on the additional training information and/or feedback. At 916, the UE 902 can perform another beam management with the BS 904 (or another BS) with the updated adaptive learning algorithm.

In some examples, the training information (and/or feedback) includes training information obtained from deploying one or more UEs in one or more simulated communication environments prior to network deployment of the one or more UEs; training information obtained by feedback previously received while the one or more UEs were deployed in one or more communication environments (e.g., based on measurements and/or a beam management procedure performed by the UE); training information from the network, one or more UEs, and/or a cloud; and/or training information received while the node was online and/or idle.

In some examples, using the adaptive learning algorithm, at 805, includes the node outputting an action on based on one or more inputs; where the feedback is associated with the action; and updating the adaptive learning algorithm based on the feedback includes adjusting one or more weights applied to the one or more inputs.

In some examples, the adaptive learning algorithm used by the node, at 805, may be an adaptive machine learning algorithm; an adaptive reinforcement learning algorithm; an adaptive deep learning algorithm; an adaptive continuous infinite learning algorithm; and/or an adaptive policy optimization reinforcement learning algorithm. As discussed above with respect to FIGS. 6-7, the adaptive learning algorithm may be modeled as a POMDP. The adaptive learning algorithm may be implemented by an artificial neural network. In some examples, the artificial neural network may be a DQN including one or more DNNs. Determining the one or more beams using the adaptive learning may include passing state parameters and action parameters through the one or more DNNs; for each state parameter, outputting a value for each action parameter; and selecting an action associated with a maximum output value. Updating the adaptive learning algorithm may include adjusting one or more weights associated with one or more neuron connections in the artificial neural networks.

In some examples, determining the one or more beams to utilize for the beam management procedure using the adaptive learning, at 805, includes determining one or more beams to include in a codebook based on the adaptive learning; and selecting one or more beams from the codebook to utilize for the beam management procedure.

In some examples, determining the one or more beams to utilize for the beam management procedure using the adaptive learning, at 805, includes using the adaptive learning to select one or more beams from a codebook to utilize for the beam management procedure.

In some examples, the adaptive learning is used to select BPLs.

In some examples, the adaptive learning uses a state parameter associated with a channel measurement, a reward parameter associated with a received signal throughput or spectral efficiency, and an action parameter associated with selection of a beam pair corresponding to the channel measurement. In some examples, the channel measurement includes RSRP; spectral efficiency, channel flatness, and/or signal-to-noise ratio (SNR). In some examples, the received signal is a PDSCH transmission.

In some examples, the reward parameter is offset by a penalty amount. In some examples, the penalty amount is dependent on a number of beams measured for the beam management procedure (e.g., beams used for transmission and/or reception of SSBs). In some examples, the penalty amount is dependent on an amount of power consumption associated with the beam management procedure.

In some examples, performing the beam management procedure using the determined one or more beams, at 810, includes measuring a channel based on SSB transmissions from a BS using the one or more determined beams, the SSB transmissions associated with a plurality of different transmit beams of the BS; and selecting one or more BPLs associated with channel measurements that are channel measurements above a channel measurement threshold and/or are one or more strongest channel measurements among all channel measurements associated with the measured SSB transmissions. In some examples, the one or more determined beams are a subset of available receive beams. In some examples, the node receives a PDSCH using one of the one or more selected BPLs; determines a throughput associated with the PDSCH; updates the adaptive learning algorithm based on the determined throughput; and uses the updated adaptive learning algorithm to determine another one or more beams to utilize for performing another beam management procedure to select another one or more BPLs.

Figure 10:
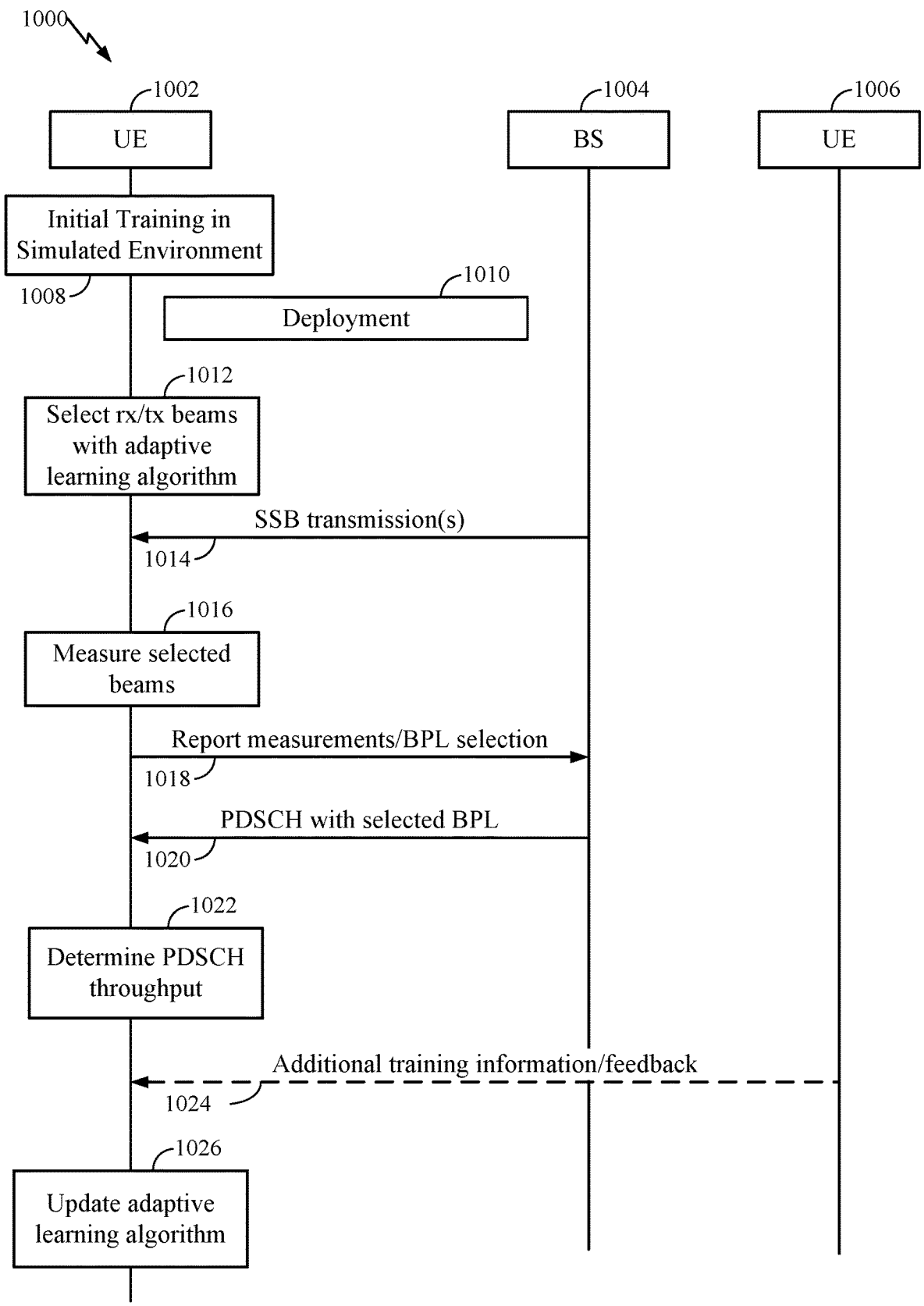
FIG. 10 is an example call flow diagram illustrating example signaling for a BPL discovery procedure using adaptive learning, in accordance with certain aspects of the present disclosure.

FIG. 10 is an example call flow diagram illustrating example signaling 1000 for a BPL discovery procedure (e.g., such as the P1 procedure 202) using adaptive learning, in accordance with certain aspects of the present disclosure. As shown in FIG. 10, at 1008, UE 1002 (e.g., such as the UE 120a) may perform initial training in a simulated environment before deployment at 1010. The initial training at 1008 may train an initial learning algorithm (e.g., including a predictive model) at the UE 1002. At 1010 the UE 1002 may be deployed in a network with at least one BS 1004 (e.g., such as the BS 110a). The UE 1002 may perform a beam management procedure (e.g., such as a P1 procedure 202) in the network with one or more BSs 1004. For example, as shown in FIG. 10, at 1012, the UE 1002 may select beams, or RX/TX beam pairs, using the adaptive learning algorithm. At 1016, the UE 1002 measures SSB transmission(s) received, at 1014, from the BS 1004, using the beam(s) selected at 1012. At 1018, the UE 1002 reports the measurements and/or BPL selection(s) to the BS 1004. Then, at 1020, the BS 1004 transmits PDSCH to the UE 1002 using the BPL indicated by the UE 1002 (or selected based on the measurements reported by the UE 1002). At 1022, the UE 1002 may determine the PDSCH throughput. The PDSCH throughput may act as feedback, or reinforcement, for the adaptive learning. At 1026, the UE 1002 updates the adaptive learning algorithm based on the feedback. Optionally, the UE 1002 may receive additional training information and/or feedback from the BS 1004 and/or another UE 1006 (e.g., UE 2), that the UE 1002 may use to update the adaptive learning algorithm at 1026. The UE 1002 may then perform another beam management with the BS 1004 (or another BS) with the updated adaptive learning algorithm.

Figure 11:
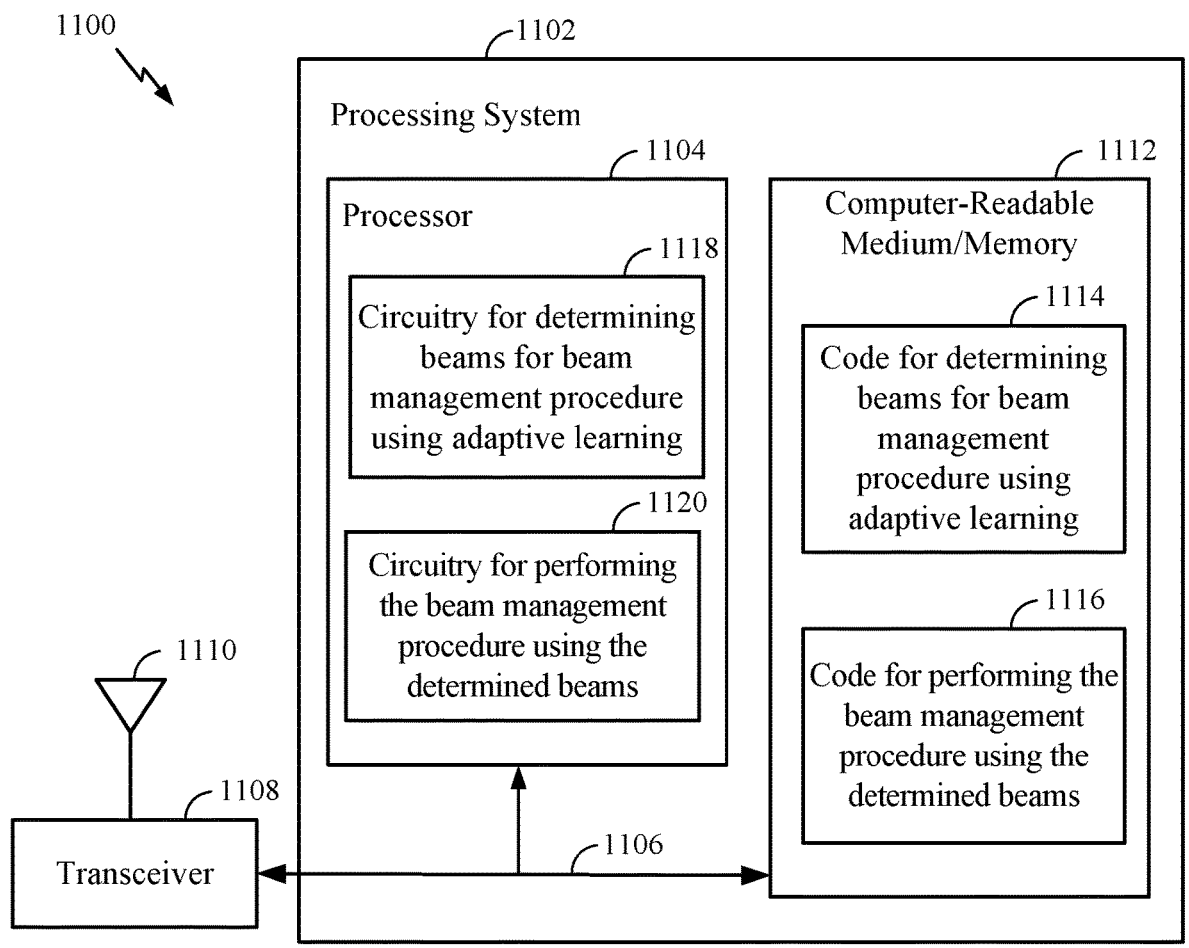
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 8. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 8, or other operations for performing the various techniques discussed herein for adaptive learning-based beam management. In certain aspects, computer-readable medium/memory 1112 stores code 1114 for determining one or more beams to utilize for a beam management procedure using adaptive learning; and code 1116 performing the beam management procedure using the determined one or more beams. In certain aspects, the processor 1104 has circuitry configured to implement the code stored in the computer-readable medium/memory 1112. The processor 1104 includes circuitry 1118 for determining one or more beams to utilize for a beam management procedure using adaptive learning; and circuitry 1120 for performing the beam management procedure using the determined one or more beams.

In some examples, communications device 1100 may include a system-on-a-chip (SOC) (not shown), which may include a central processing unit (CPU) or a multi-core CPU configured to perform adaptive learning-based beam management, in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU), in a memory block associated with a CPU, in a memory block associated with a digital signal processor (DSP), in a different memory block, or may be distributed across multiple memory blocks. Instructions executed at the CPU may be loaded from a program memory associated with the CPU or may be loaded from a different memory block.

In some examples, the adaptive learning-based beam management described herein may allow for a P1 procedure to be improved by adaptively updating the beam management algorithm such that the beam selection may be refined to more intelligently select the beams to measure based on the learning. Thus, the UE may find BPLs while measuring fewer beams.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Figure 12:
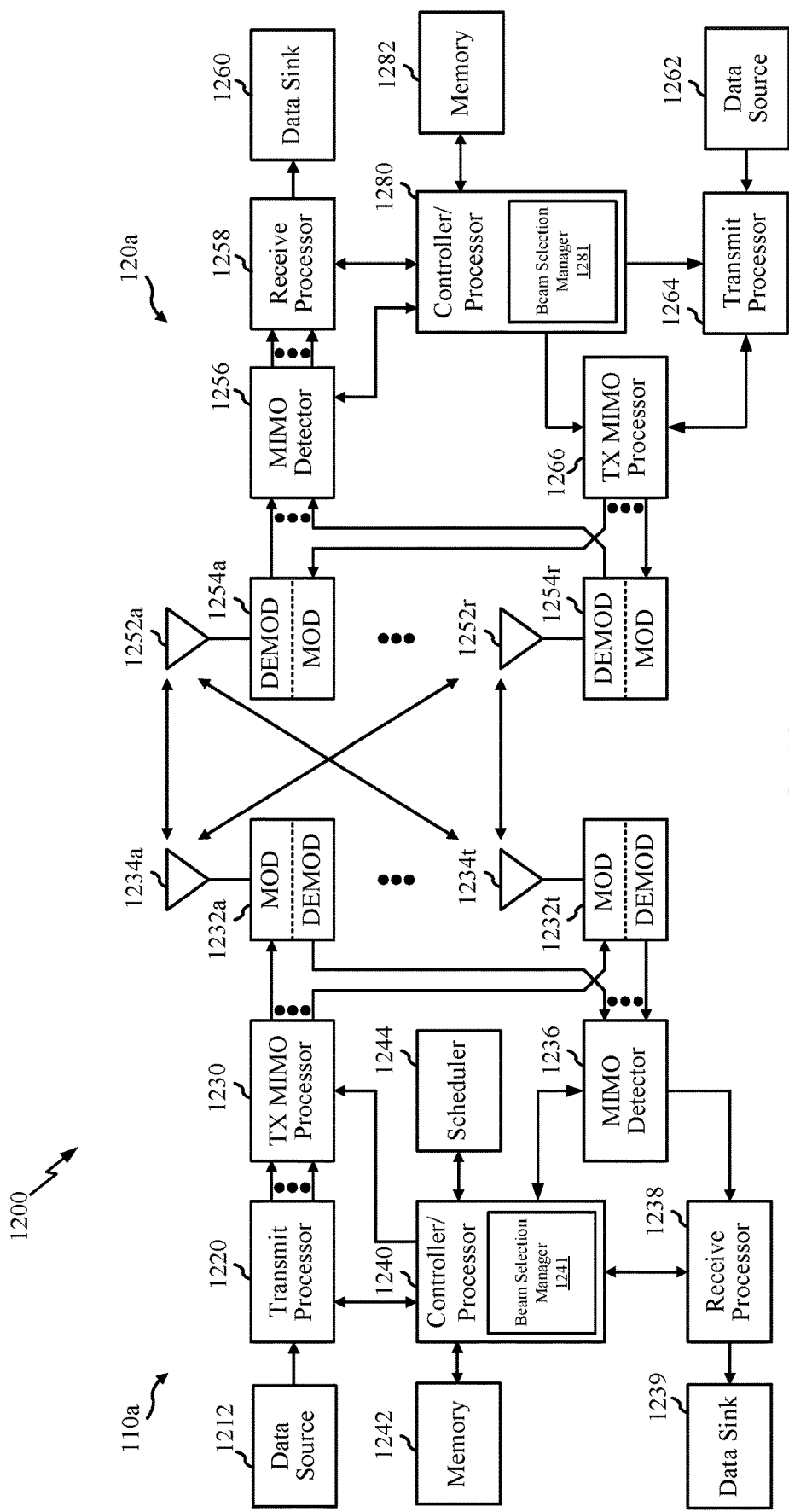
FIG. 12 is a block diagram conceptually illustrating a design of an example base station (BS) and user equipment (UE), in accordance with certain aspects of the present disclosure.

FIG. 12 illustrates example components of BS 110a and UE 120a (e.g., in the wireless communication network 100 of FIG. 1), which may be used to implement aspects of the present disclosure. For example, antennas 1252, processors 1266, 1258, 1264, and/or controller/processor 1280 of the UE 120a and/or antennas 1234, processors 1220, 1230, 1238, and/or controller/processor 1240 of the BS 110a may be used to perform the various techniques and methods described herein. As shown in FIG. 12, the controller/processor 1280 of the UE 120a has a beam selection manager 1281 that may be configured for determining beams using adaptive learning, for example to use for a beam management procedure, according to aspects described herein. As shown in FIG. 12, additionally or alternatively, the controller/processor 1240 of the BS 110a can have a beam selection manager 1241 that may be configured for determining beams using adaptive learning, according to aspects described herein.

At the BS 110a, a transmit processor 1220 may receive data from a data source 1212 and control information from a controller/processor 1240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 1220 may process (e.g., encode and symbol map) the data and control information to obtain data symbols and control symbols, respectively. The transmit processor 1220 may also generate reference symbols, such as for the primary synchronization signal (PSS), secondary synchronization signal (SSS), and cell-specific reference signal (CRS). A transmit (TX) multiple-input multiple-output (MIMO) processor 1230 may perform spatial processing (e.g., precoding) on the data symbols, the control symbols, and/or the reference symbols, if applicable, and may provide output symbol streams to the modulators (MODs) 1232a-1232t. Each modulator 1232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 1232a-1232t may be transmitted via the antennas 1234a-1234t, respectively.

At the UE 120a, the antennas 1252a-1252r may receive the downlink signals from the BS 110a and may provide received signals to the demodulators (DEMODs) in transceivers 1254a-1254r, respectively. Each demodulator 1254 may condition (e.g., filter, amplify, downconvert, and digitize) a respective received signal to obtain input samples. Each demodulator may further process the input samples (e.g., for OFDM, etc.) to obtain received symbols. A MIMO detector 1256 may obtain received symbols from all the demodulators 1254a-1254r, perform MIMO detection on the received symbols if applicable, and provide detected symbols. A receive processor 1258 may process (e.g., demodulate, deinterleave, and decode) the detected symbols, provide decoded data for the UE 120*a* to a data sink 1260, and provide decoded control information to a controller/processor 1280.

On the uplink, at UE 120*a*, a transmit processor 1264 may receive and process data (e.g., for the physical uplink shared channel (PUSCH)) from a data source 1262 and control information (e.g., for the physical uplink control channel (PUCCH) from the controller/processor 1280. The transmit processor 1264 may also generate reference symbols for a reference signal (e.g., for the sounding reference signal (SRS)). The symbols from the transmit processor 1264 may be precoded by a TX MIMO processor 1266 if applicable, further processed by the demodulators in transceivers 1254*a*-1254*r* (e.g., for SC-FDM, etc.), and transmitted to the base station 110*a*. At the BS 110*a*, the uplink signals from the UE 120*a* may be received by the antennas 1234, processed by the modulators 1232, detected by a MIMO detector 1236 if applicable, and further processed by a receive processor 1238 to obtain decoded data and control information sent by the UE 120*a*. The receive processor 1238 may provide the decoded data to a data sink 1239 and the decoded control information to the controller/processor 1240.

The controllers/processors 1240 and 1280 may direct the operation at the BS 110*a* and the UE 120*a*, respectively. The controller/processor 1240 and/or other processors and modules at the BS 110*a* may perform or direct the execution of processes for the techniques described herein. The memories 1242 and 1282 may store data and program codes for BS 110*a* and UE 120*a*, respectively. A scheduler 1244 may schedule UEs for data transmission on the downlink and/or uplink.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development in conjunction with the 5G Technology Forum (5GTF). NR access (e.g., 5G NR) may support various wireless communication services, such as mmW. NR may utilize OFDM with a CP on the uplink and downlink and include support for half-duplex operation using TDD. Beam forming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported.

In 3GPP, the term "cell" can refer to a coverage area of a Node B (NB) and/or a NB subsystem serving this coverage area, depending on the context in which the term is used. In NR systems, the term "cell", BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A node, such as a wireless node, may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UE 120a (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium storing instructions (and/or encoded) thereon, the instructions being executable by one or more processors to perform the operations described herein, for example, instructions for performing the operations described herein and illustrated in FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a node, comprising:
    determining one or more beams to utilize for a beam management procedure using adaptive learning; and
    performing the beam management procedure using the determined one or more beams, wherein the adaptive learning uses a state parameter associated with a channel measurement, a reward parameter associated with a received signal throughput or spectral efficiency, and an action parameter associated with selection of a beam pair corresponding to the channel measurement.

2. The method of claim 1, further comprising:
    updating an adaptive learning algorithm used for the adaptive learning based on feedback or training information, or a combination thereof; and
    performing another beam management procedure using the updated adaptive learning algorithm.

3. The method of claim 2, wherein the feedback comprises feedback associated with the beam management procedure.

4. The method of claim 2, wherein the training information comprises:
    training information obtained from deploying one or more user equipment (UEs) in one or more simulated communication environments prior to network deployment of the one or more UEs;
    training information obtained by feedback previously received while the one or more UEs was deployed in one or more communication environments;
    training information from at least one of the network, one or more UEs, or a cloud; or
    training information received while the node was at least one of online or idle; or
    a combination thereof.

5. The method of claim 4, wherein the training information comprises training information received from one or more UEs, different than the node, after deployment of the node, wherein the training information comprises information associated with beam measurements by the one or more UEs, or feedback associated with one or more beam management procedures performed by the one or more UEs, or a combination thereof.

6. The method of claim 4, wherein the node comprises a UE.

7. The method of claim 2, wherein:
    using the adaptive learning algorithm includes outputting an action based on one or more inputs;
    the feedback is associated with the action; and
    updating the adaptive learning algorithm based on the feedback comprises adjusting one or more weights applied to the one or more inputs.

8. The method of claim 2, wherein the adaptive learning algorithm comprises an adaptive machine learning algorithm; an adaptive reinforcement learning algorithm; an adaptive deep learning algorithm; an adaptive continuous infinite learning algorithm; or an adaptive policy optimization reinforcement learning algorithm, or a combination thereof.

9. The method of claim 2, wherein the adaptive learning algorithm is modeled as a partially observable Markov Decision Process (POMDP).

10. The method of claim 2, wherein the adaptive learning algorithm is implemented by an artificial neural network.

11. A method for wireless communication by a node, comprising:
    determining one or more beams to utilize for a beam management procedure using adaptive learning;
    performing the beam management procedure using the determined one or more beams;
    updating an adaptive learning algorithm used for the adaptive learning based on feedback or training information, or a combination thereof, the adaptive learning algorithm being implemented by an artificial neural network, the artificial neural network comprising a deep Q network (DQN) comprising one or more deep neural networks (DNNs); and
    performing another beam management procedure using the updated adaptive learning algorithm,
    wherein the determining the one or more beams to utilize for the beam management procedure using the adaptive learning includes:
        passing one or more state parameters and one or more action parameters through the one or more DNNs;
        for each state parameter, outputting a value for each action parameter; and
        selecting an action associated with a maximum output value.

12. A method for wireless communication by a node, comprising:
    determining one or more beams to utilize for a beam management procedure using adaptive learning;
    performing the beam management procedure using the determined one or more beams;
    updating an adaptive learning algorithm used for the adaptive learning based on feedback or training information, or a combination thereof, the adaptive learning algorithm being implemented by an artificial neural network, wherein the updating the adaptive learning algorithm comprises adjusting one or more weights associated with one or more neuron connections in the artificial neural network; and
    performing another beam management procedure using the updated adaptive learning algorithm.

13. The method of claim 1, wherein determining the one or more beams to utilize for the beam management procedure using the adaptive learning includes:
   determining one or more beams to include in a codebook based on the adaptive learning; and
   selecting one or more beams from the codebook to utilize for the beam management procedure.

14. The method of claim 1, wherein determining the one or more beams to utilize for the beam management procedure includes using the adaptive learning to select one or more beams from a codebook to utilize for the beam management procedure.

15. The method of claim 1, wherein the channel measurement comprises a reference signal receive power (RSRP); a spectral efficiency, a channel flatness, or a signal-to-noise ratio (SNR); or a combination thereof.

16. The method of claim 1, wherein the received signal comprises a physical downlink shared channel (PDSCH) transmission.

17. The method of claim 1, wherein the reward parameter is offset by a penalty amount.

18. The method of claim 17, wherein the penalty amount is dependent on a number of the one or more beams measured for the beam management procedure.

19. The method of claim 17, wherein the penalty amount is dependent on an amount of power consumption associated with the beam management procedure.

20. The method of claim 1, wherein the one or more beams are utilized for transmission, reception, or both of one or more synchronization signal blocks (SSBs).

21. The method of claim 1, wherein performing the beam management procedure using the determined one or more beams includes:
   measuring a channel based on synchronization signal block (SSB) transmissions from a base station (BS) using the determined one or more beams, the SSB transmissions associated with one or more transmit beams of the BS; and
   selecting one or more beam pair links (BPLs) associated with one or more channel measurements that are above a channel measurement threshold; or one or more strongest channel measurements among all channel measurements associated with the SSB transmissions; or a combination thereof.

22. The method of claim 21, wherein the determined one or more beams comprises a subset of available receive beams.

23. The method of claim 21, further comprising:
   receiving a physical downlink shared channel (PDSCH) using one of the one or more BPLs;
   determining a throughput associated with the PDSCH;
   updating the adaptive learning algorithm based on the determined throughput; and
   using the updated adaptive learning algorithm to determine another one or more beams to utilize for performing another beam management procedure to select another one or more BPLs.

24. A node configured for wireless communication, comprising:
   means for determining one or more beams to utilize for a beam management procedure using adaptive learning; and
   means for performing the beam management procedure using the determined one or more beams, the means for performing the beam management procedure including:
      means for measuring a channel based on synchronization signal block (SSB) transmissions from a base station (BS) using the determined one or more beams, the SSB transmissions being associated with one or more transmit beams of the BS; and
      means for selecting one or more beam pair links (BPLs) associated with one or more channel measurements that are above a channel measurement threshold, or one or more strongest channel measurements among all channel measurements associated with the SSB transmissions, or a combination thereof.

25. The node of claim 24, further comprising:
   means for updating an adaptive learning algorithm used for the adaptive learning based on feedback or training information, or a combination thereof; and
   means for performing another beam management procedure using the updated adaptive learning algorithm.

26. The node of claim 24, further comprising:
   means for receiving a physical downlink shared channel (PDSCH) using one of the one or more BPLs;
   means for determining a throughput associated with the PDSCH;
   means for updating the adaptive learning algorithm based on the determined throughput; and
   means for using the updated adaptive learning algorithm to determine another one or more beams to utilize for performing another beam management procedure to select another one or more BPLs.

27. A node configured for wireless communication, comprising:
   a memory; and
   a processor coupled to the memory, the memory and the processor configured to:
      determine one or more beams to utilize for a beam management procedure using adaptive learning; and
      perform the beam management procedure using the determined one or more beams, in performing the beam management procedure, the memory and the processor further configured to:
         measure a channel based on synchronization signal block (SSB) transmissions from a base station (BS) using the determined one or more beams, the SSB transmissions being associated with one or more transmit beams of the BS; and
         select one or more beam pair links (BPLs) associated with one or more channel measurements that are above a channel measurement threshold, or one or more strongest channel measurements among all channel measurements associated with the SSB transmissions, or a combination thereof.

28. A non-transitory computer readable medium storing computer executable code, comprising:
   code for determining one or more beams to utilize for a beam management procedure using adaptive learning; and
   code for performing the beam management procedure using the determined one or more beams, the code for performing the beam management procedure including:
      code for measuring a channel based on synchronization signal block (SSB) transmissions from a base station (BS) using the determined one or more beams, the SSB transmissions being associated with one or more transmit beams of the BS; and
      code for selecting one or more beam pair links (BPLs) associated with one or more channel measurements that are above a channel measurement threshold, or one or more strongest channel measurements among all channel measurements associated with the SSB transmissions, or a combination thereof.

29. An apparatus for wireless communication, comprising:
- a memory;
- a processor couple to the memory, the memory and the processor configured to:
  - determine one or more beams to utilize for a beam management procedure using adaptive learning; and
  - perform the beam management procedure using the determined one or more beams, wherein the adaptive learning uses a state parameter associated with a channel measurement, a reward parameter associated with a received signal throughput or spectral efficiency, and an action parameter associated with selection of a beam pair corresponding to the channel measurement.

30. An apparatus for wireless communication, comprising:
- a memory;
- a processor coupled to the memory, the memory and the processor configured to:
  - determine one or more beams to utilize for a beam management procedure using adaptive learning;
  - perform the beam management procedure using the determined one or more beams;
  - update an adaptive learning algorithm used for the adaptive learning based on feedback or training information, or a combination thereof, the adaptive learning algorithm being implemented by an artificial neural network, the artificial neural network comprising a deep Q network (DQN) comprising one or more deep neural networks (DNNs); and
  - perform another beam management procedure using the updated adaptive learning algorithm,
- wherein to determine the one or more beams to utilize for the beam management procedure using the adaptive learning, the memory and the processor are configured to:
  - pass one or more state parameters and one or more action parameters through the one or more DNNs;
  - for each state parameter, output a value for each action parameter; and
  - select an action associated with a maximum output value.

31. An apparatus for wireless communication, comprising:
- a memory;
- a processor coupled to the memory, the memory and the processor configured to:
  - determine one or more beams to utilize for a beam management procedure using adaptive learning;
  - perform the beam management procedure using the determined one or more beams;
  - update an adaptive learning algorithm used for the adaptive learning based on feedback or training information, or a combination thereof, the adaptive learning algorithm being implemented by an artificial neural network, wherein in updating the adaptive learning algorithm, the memory and the processor are further configured to adjust one or more weights associated with one or more neuron connections in the artificial neural network; and
  - perform another beam management procedure using the updated adaptive learning algorithm.

* * * * *